(12) United States Patent
Ito et al.

(10) Patent No.: US 10,719,282 B2
(45) Date of Patent: Jul. 21, 2020

(54) CONTROL APPARATUS EXECUTING PRINTING OF A PRINT JOB, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventors: Morikazu Ito, Tokyo (JP); Kazuhide Hasegawa, Kashiwa (JP); Ryousuke Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/155,265

(22) Filed: Oct. 9, 2018

(65) Prior Publication Data

US 2019/0107983 A1 Apr. 11, 2019

(30) Foreign Application Priority Data

Oct. 11, 2017 (JP) .................................. 2017-197770

(51) Int. Cl.
*G06F 3/12* (2006.01)

(52) U.S. Cl.
CPC .......... *G06F 3/1258* (2013.01); *G06F 3/1204* (2013.01); *G06F 3/1267* (2013.01)

(58) Field of Classification Search
CPC .............................. G06F 3/1258; G06F 3/1204
USPC ....................................... 358/1.15, 1.9, 3.23
See application file for complete search history.

(56) References Cited

U.S. PATENT DOCUMENTS

| | | | | |
|---|---|---|---|---|
| 6,213,652 B1* | 4/2001 | Suzuki | .................. | G06F 3/1204 358/1.15 |
| 8,724,142 B2 | 5/2014 | Sato | | |
| 8,820,732 B2* | 9/2014 | Harano | .............. | G03G 15/6594 271/9.01 |
| 9,195,414 B2 | 11/2015 | Sato | | |
| 2001/0048833 A1* | 12/2001 | Katsuda | ................ | G06F 3/1204 400/76 |
| 2002/0135792 A1* | 9/2002 | Sommer | ................ | G06K 15/00 358/1.13 |

FOREIGN PATENT DOCUMENTS

| | | |
|---|---|---|
| JP | H07-175605 A | 7/1995 |
| JP | 2010-160617 A | 7/2010 |
| JP | 2016-152025 A | 8/2016 |

\* cited by examiner

*Primary Examiner* — Jamares Q Washington
(74) *Attorney, Agent, or Firm* — Venable LLP

(57) ABSTRACT

A printer that executes printing based on a print job includes a memory containing instructions, and at least one processor for executing the instructions to operate as a first receiving unit configured to receive from a computer a print job instructing the printer to print a plurality of copies using a plurality of feeding trays, with a different feeding tray instructed to be used for each of the copies, a display unit configured to display the number of copies of the print job, and a second receiving unit configured to receive an instruction from a user to change the displayed number of copies of the print job. In addition, instructions are executed to operate as a cancelling unit configured to cancel, based on the changed number of copies, the print job, the number of copies of which has been instructed to be changed.

14 Claims, 28 Drawing Sheets

FIG. 9A

```
PLEASE SELECT A JOB
                        [PRINT STANDBY]  [PRINTED]   [UPDATE]
                              901          902        903

┌─────────────────────────────────────────────────────────┐
│ JOB NAME    │ DATE/TIME │ COPY COUNT ×  │ USER NAME    │
│             │           │ COPY COUNT    │              │
├─────────────────────────────────────────────────────────┤
│ ☑ Document1 │ 01/01     │    5x2        │ UserA        │ — 904
│             │ 12:00     │ CARBON COPY   │              │
├─────────────────────────────────────────────────────────┤
│ ☐ Document2 │ 01/01     │    10x1       │ UserA        │ — 905
│             │ 12:00     │               │              │
└─────────────────────────────────────────────────────────┘

SELECTED
JOB COUNT:0      [ SELECT ALL ] — 909        [      ] COPIES — 910
TOTAL:0

[PRINT    ] [DISPLAY ] [DELETE ]            [START    ]
[SETTINGS ] [IMAGE   ] [JOB    ]            [PRINTING ]
   911        912        913                    914
```

FIG. 9B

```
PLEASE SELECT A JOB
                        [PRINT STANDBY]  [PRINTED]   [UPDATE]

┌─────────────────────────────────────────────────────────┐
│ JOB NAME    │ DATE/TIME │ COPY COUNT ×  │ USER NAME    │
│             │           │ COPY COUNT    │              │
├─────────────────────────────────────────────────────────┤
│ ☑ Document1 │ 01/01     │    5x2        │ UserA        │ — 904
│             │ 12:00     │ CARBON COPY   │              │
├─────────────────────────────────────────────────────────┤
│ ☐ Document2 │ 01/01     │    10x1       │ UserA        │ — 905
│             │ 12:00     │               │              │
└─────────────────────────────────────────────────────────┘

SELECTED
JOB COUNT:0      [ SELECT ALL ]            [▓▓▓▓▓▓] COPIES — 910
TOTAL:0

[PRINT    ] [DISPLAY ] [DELETE ]            [START    ]
[SETTINGS ] [IMAGE   ] [JOB    ]            [PRINTING ]
```

F I G. 17A

| JOB NAME | DATE/TIME | COPY COUNT × COPY COUNT | USER NAME | |
|---|---|---|---|---|
| ☐ FIRST COPY OF Document1 | 01/01 12:00 | 5x1 | UserA | ~1701 |
| ☐ SECOND COPY OF Document1 | 01/01 12:00 | 5x1 | UserA | ~1702 |
| ☐ Document2 | 01/01 12:00 | 10x1 | UserA | |

PLEASE SELECT A JOB

[PRINT STANDBY] [PRINTED] [UPDATE]

SELECTED JOB COUNT:0
TOTAL:0     [SELECT ALL]          [    ] COPIES

[PRINT SETTINGS] [DISPLAY IMAGE] [DELETE JOB]       [START PRINTING]

FIG. 17B

1710:
```
<documentName>Document1</documentName>
<pageCount>5</pageCount>
<copies>2</copies>
<inputTray1>cassette1</inputTray1>
<inputTray2>cassette2</inputTray2>
<colorMode>2</colorMode>
<plex>0</plex>
```

1711:
```
<?xml version="1.0" encoding="UTF-8" standalone="yes"?>
<BiblioData>
 <BiblioInfo>
  <charset>1010</charset>
  <storedHost>192.168.0.1</storedHost>
  <documentId>000000001</documentId>
  <userId>UserA</userId>
  <savedDate>2015/06/01 13:00:00</savedDate>
  <documentName>FIRST COPY OF Document1</documentName>
  <pageCount>5</pageCount>
  <copies>1</copies>
  <inputTray1>cassette1</inputTray1>
  <colorMode>2</colorMode>
  <plex>0</plex>
  ...
  <isPrinted>0</isPrinted>
  ...
  <SettingHistory>
  </SettingHistory>
 </BiblioInfo>
</BiblioData>
```

1712:
```
<?xml version="1.0" encoding="UTF-8" standalone="yes"?>
<BiblioData>
 <BiblioInfo>
  <charset>1010</charset>
  <storedHost>192.168.0.1</storedHost>
  <documentId>000000001</documentId>
  <userId>UserA</userId>
  <savedDate>2015/06/01 13:00:00</savedDate>
  <documentName>SECOND COPY OF Document1</documentName>
  <pageCount>5</pageCount>
  <copies>1</copies>
  <inputTray1>cassette2</inputTray1>
  <colorMode>2</colorMode>
  <plex>0</plex>
  ...
  <isPrinted>0</isPrinted>
  ...
  <SettingHistory>
  </SettingHistory>
 </BiblioInfo>
</BiblioData>
```

CONTROL APPARATUS EXECUTING PRINTING OF A PRINT JOB, CONTROL METHOD, AND NON-TRANSITORY COMPUTER-READABLE STORAGE MEDIUM STORING PROGRAM

BACKGROUND OF THE INVENTION

Field of the Invention

The present invention relates to a control apparatus that controls the execution of a job, a control method, and a non-transitory computer-readable storage medium storing a program.

Description of the Related Art

When document data created by an application in a personal computer or the like is to be printed by an image forming apparatus, a program called a driver which is suited for the image forming apparatus is installed in the personal computer, and the document data is converted into a print job and transmitted. Here, a print job is data formed from print settings and print data. In order to cause the image forming apparatus to output a desired output result, the driver can designate various kinds of print settings.

A carbon copy function is one of such settings and is a function of printing and outputting, in addition to an output product for submission, a duplicate copy of the output product (Japanese Patent Laid-Open Nos. 7-175605 and 2016-152025). In the carbon copy function, feeding trays are designated for the submission output product and for the duplicate output product, respectively. It is also possible to output a plurality of output products for submission and a plurality of output products as duplicate copies, and the feeding tray will be designated for each copy in this case.

In recent years, a function in which a print job is temporarily held in a device or a server and the print processing of the job is started based on an instruction from the device has become widespread. There is also known an apparatus that allows the print setting to be changed by such a function (Japanese Patent Laid-Open No. 2010-160617).

In a case in which a carbon copy job that has been received from a driver is temporarily held in an image forming apparatus, there is a possibility that printing will not be executed appropriately if the print copy count setting is changed by a user and the association between the print copy count and the feeding copy count becomes inconsistent. For example, if a carbon copy job is executed after the print copy count has been decreased, each copy may not be output from a desired feeding stage. In addition, if a carbon copy job is executed after the print copy count has been increased, sheets may be output wastefully.

SUMMARY OF THE INVENTION

An aspect of the present invention is to eliminate the above-mentioned problems with the conventional technology. The present invention provides a control apparatus, a control method, and a non-transitory computer-readable medium storing a program that can prevent printing from being executed inappropriately due to changes in the print copy count made by a user when a carbon copy job is to be executed.

The present invention in one aspect provides an image forming apparatus that executes printing based on a print job, comprising: an accepting unit configured to accept an instruction to execute a print job in which a feeding stage of the image forming apparatus has been designated for each copy; a display unit configured to display a user interface screen for accepting an operation to change a copy count of the print job; and a control unit configured to control the execution of the print job accepted by the accepting unit, wherein in a case in which the execution of the print job is a hold printing operation in the image forming apparatus, the control unit controls the operation to change the copy count via the user interface screen.

According to the present invention, when a carbon copy job is to be executed, it is possible to prevent printing from being executed inappropriately due to changes in the print copy count made by a user.

Further features of the present invention will become apparent from the following description of exemplary embodiments with reference to the attached drawings.

BRIEF DESCRIPTION OF THE DRAWINGS

FIGS. 9A and 9B are views each showing a UI screen of the image forming apparatus;

FIGS. 17A and 17B are views showing a UI screen of an image forming apparatus;

DESCRIPTION OF THE EMBODIMENTS

Figure 1:
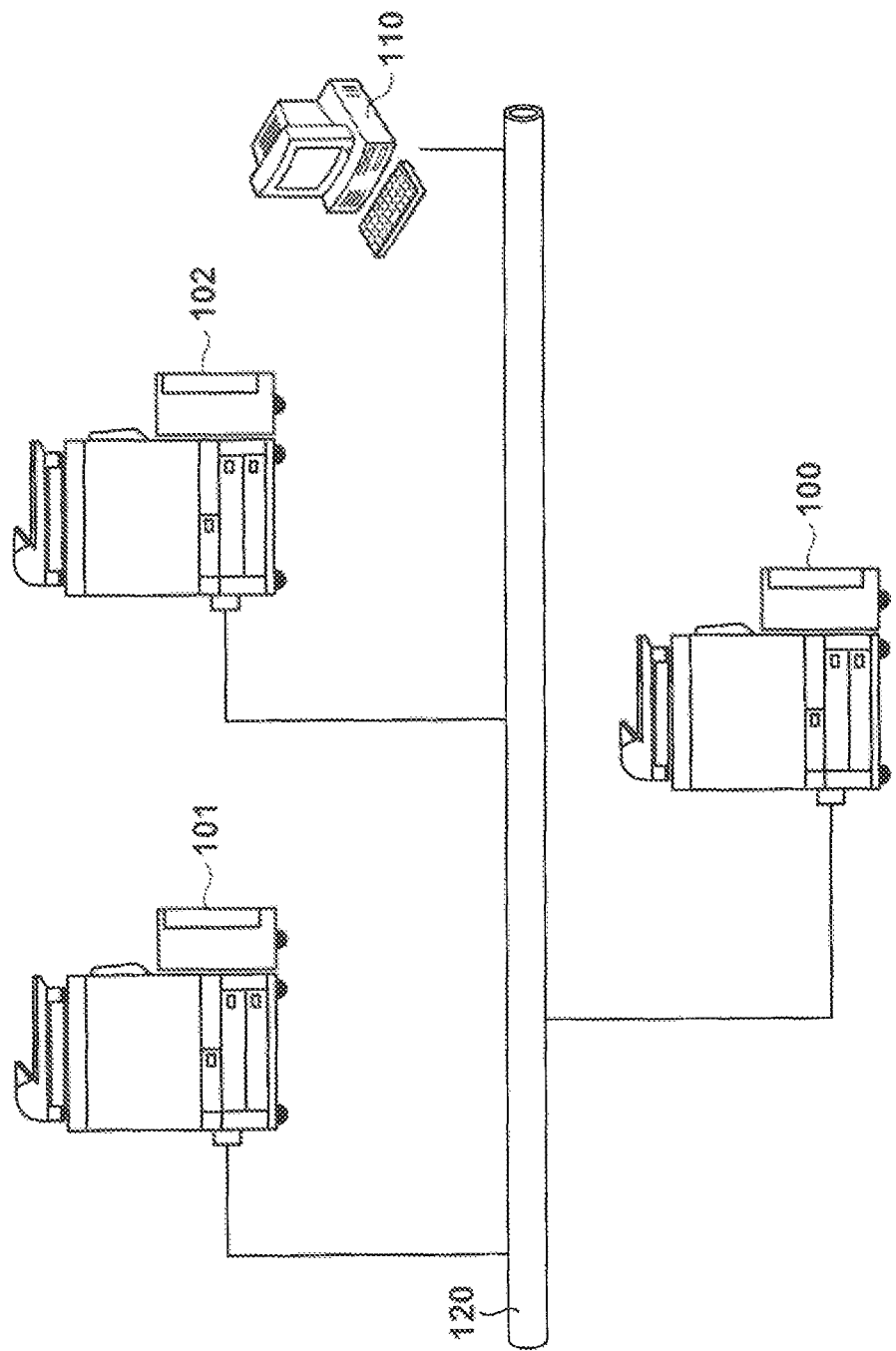
FIG. 1 is a view showing the arrangement of an image forming system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components throughout the embodiments, and a description thereof will be omitted.

First Embodiment

FIG. 1 is a view showing an image forming system according to this embodiment. Image forming apparatuses 100, 101, and 102 are connected to a network 120 and can communicate with a PC 110 (information processing apparatus) and other external apparatuses via the network 120 by a wired or wireless medium. The PC 110 transmits, for example, a print job to each of the image forming apparatuses 100, 101, and 102 via the network 120. Upon receiving a print job, each of the image forming apparatuses 100, 101, and 102 executes print processing based on the received print job. In the following description, the image forming apparatus 100 will be used as a representative example of the image forming apparatuses 100, 101, and 102 for the sake of descriptive convenience.

Figure 2A:
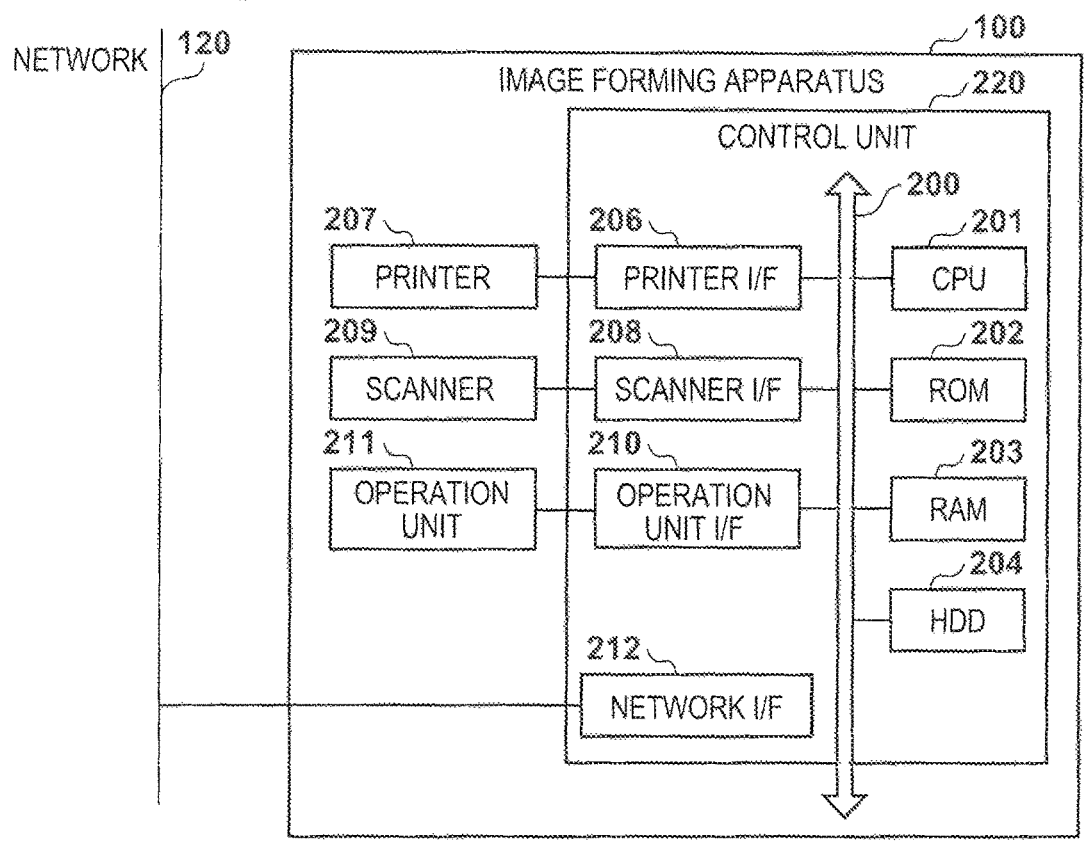
FIGS. 2A and 2B are block diagrams each showing the arrangement of an apparatus in the image forming system.

FIG. 2A is a block diagram showing the arrangement of the image forming apparatus 100. Although a multifunctional peripheral (MFP), which integrates a plurality of functions such as a printer function, a scanner function, and the like, is assumed to be the image forming apparatus 100 according to this embodiment, a printer that does not have a scanner function may also be assumed as the image forming apparatus.

A CPU 201 reads out control programs stored in a ROM 202 and executes various kinds of processing operations for integrally controlling the image forming apparatus 100. The CPU 201 is connected to other units by a bus 200. The ROM 202 stores, for example, the control programs. A RAM 203 is used, for example, as a temporary storage area for the main memory of the CPU 201, a work area and the like. An HDD 204 stores, for example, various kinds of data such as print target data, a scan image, and the like.

Although it will be assumed that the one CPU 201 will execute the processing operations which are illustrated in the respective flowcharts (to be described later) in the image forming apparatus 100, another mode may be adopted. For example, it may be arranged so that a plurality of CPUs will cooperate and execute the processing operations, which are illustrated in the respective flowcharts (to be described later).

A printer I/F 206 connects a printer 207 (printer engine) and the bus 200. The printer 207 executes print processing based on print target image data received from an external apparatus, image data read and generated by a scanner 209, and the like. A scanner I/F 208 connects the scanner 209 (scanner engine) and the bus 200. The scanner 209 optically reads an original and generates image data. The image data generated by the scanner 209 is printed by the printer 207 or stored in the HDD 204 in accordance with the functions of the image forming apparatus 100.

An operation unit I/F 210 connects an operation unit 211 and the bus 200. The operation unit 211 includes a keyboard and a liquid crystal display unit which has a touch panel function, and can display various kinds of user interface screens. The operation unit 211 accepts instructions and information to the image forming apparatus 100 from a user. A network I/F 212 executes communication with an apparatus on the network 120 by connecting to the network 120. The network I/F 212 receives, for example, a print job and print-target image data transmitted from an apparatus on the network 120. If the printer function is to be executed, print processing is executed by the printer 207 based on the received print job and image data.

The bus 200, the CPU 201, the ROM 202, the RAM 203, the HDD 204, the printer I/F 206, the scanner I/F 208, the operation unit I/F 210, and the network I/F 212 will be collectively called a control unit 220.

Figure 2B:
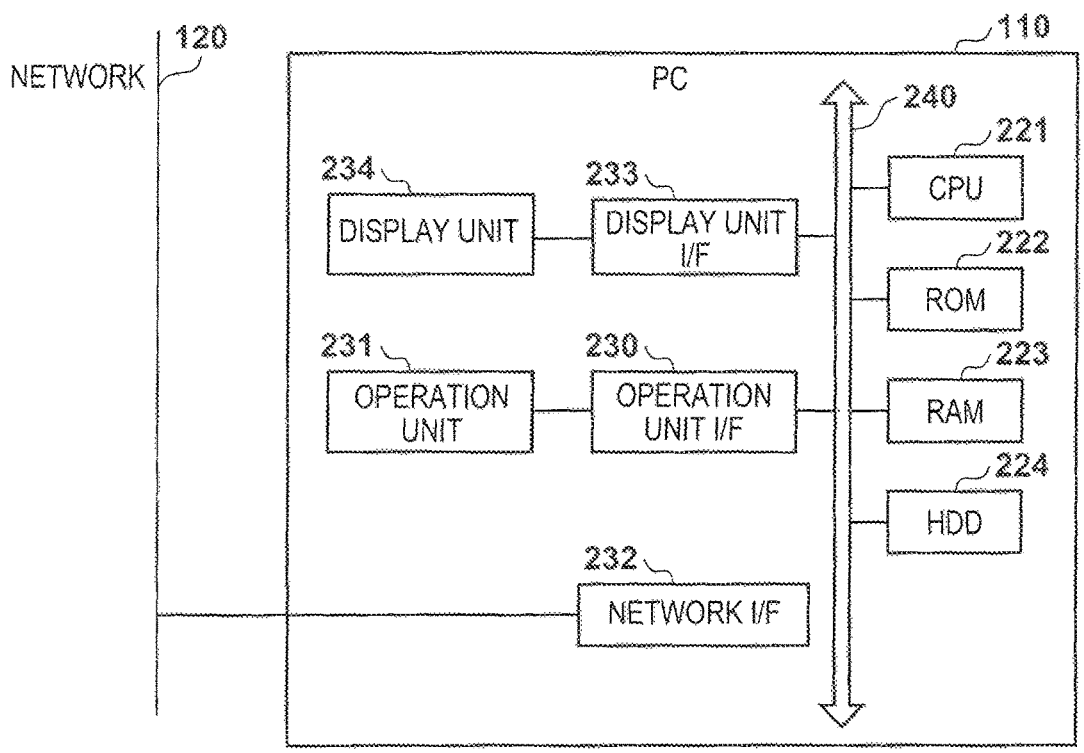

FIG. 2B is a block diagram showing the arrangement of the PC 110. A CPU 221 reads out control programs stored in a ROM 222 and executes various kinds of processing operations for integrally controlling the PC 110. The CPU 221 is connected to other units by a bus 240. The ROM 222 stores, for example, the control programs. A RAM 223 is used, for example, as a temporary storage area for the main memory of the CPU 221, a work area and the like. An HDD 224 stores, for example, various kinds of data such as print target data, a scan image, and the like.

An operation unit I/F 230 connects an operation unit 231 and the bus 240. The operation unit 231 includes a pointing device and a keyboard, and accepts instructions and information to the PC 110 from the user. A display unit I/F 233 connects a display unit 234 and the bus 240. The display unit 234 includes a display and displays information of the PC 110 and various kinds of interface screens to the user.

A network I/F 232 executes communication with an apparatus on the network 120 by connecting to the network 120. The network I/F 232 transmits, for example, a print job and print-target image data to the image forming apparatus 100.

Figure 3:
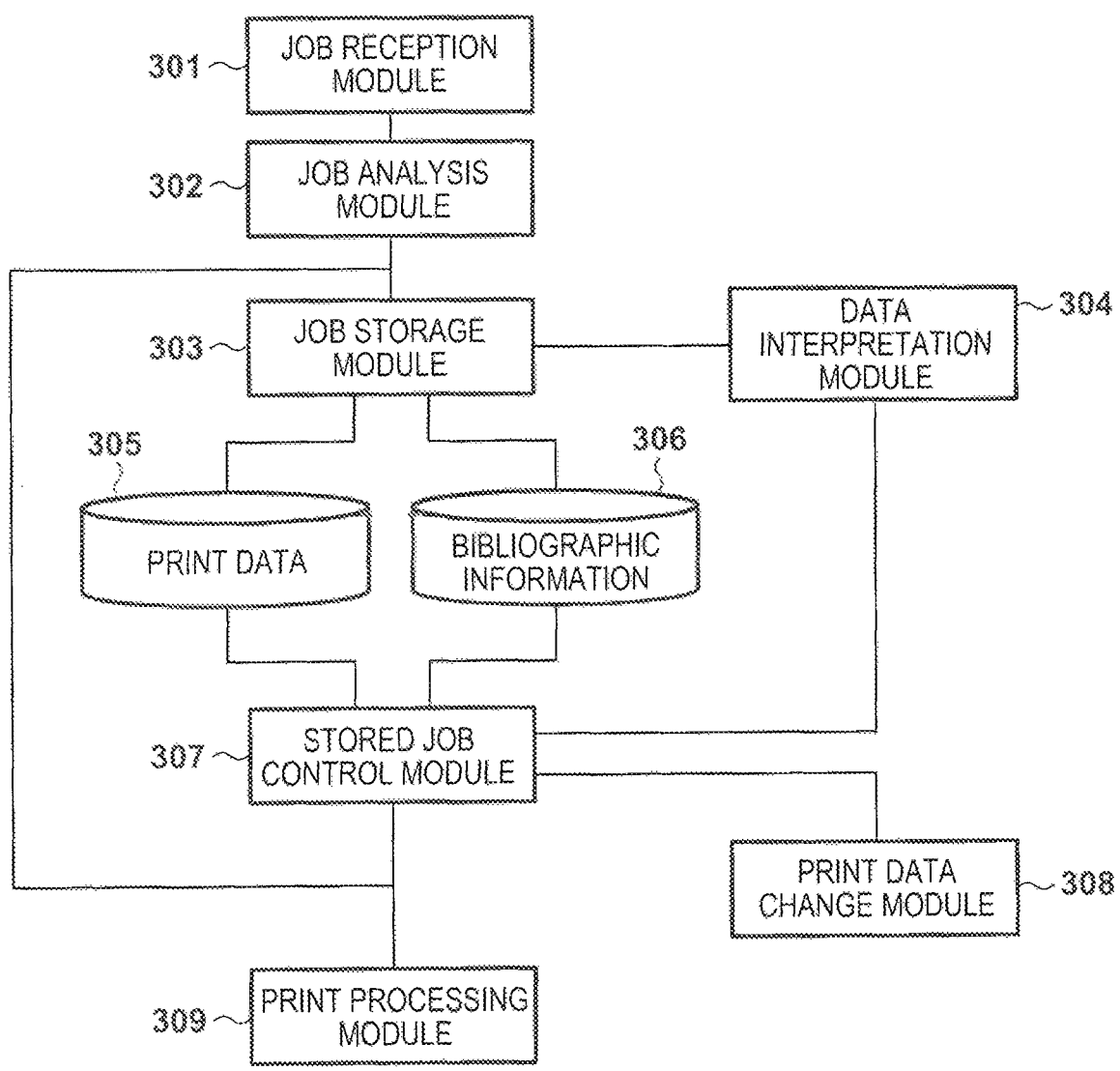
FIG. 3 is a view showing the software arrangement of an image forming apparatus.

FIG. 3 is a view showing the arrangement of software for controlling the control unit 220 of the image forming apparatus 100. Note that each software module shown in FIG. 3 is stored as a file in the HDD 204, is loaded to the RAM 203 by the OS or another software module, and is executed by the CPU 201.

A job reception module 301 executes processing to receive a print job that has been transferred via the network I/F 212. Here, a communication protocol used to receive the print job is, for example, LPR or RAW. A print job to be received by the job reception module 301 can be of various kinds of formats. For example, a print job may be received in a format in which a job control command portion has been added to a PDL (Page Description Language) portion such as LIPS, PostScript, or the like. Details of the print job to be received by the job reception module 301 will be later. The print job received by the job reception module 301 is temporarily stored in the RAM 203.

A job analysis module 302 is connected to the job reception module 301 and determines whether to transmit a notification about the received print job to a job storage module 303 or a print processing module 309. This determination will be made based on a setting value preset in the HDD 204, information set in the job control command portion of the print job that was stored in the RAM 203 by the job reception module 301, or a communication parameter (for example, the IP address) of the transfer source. Hence, the job analysis module 302 can analyze the job control command portion included in the print job. Note that it is not necessary to wait until the job reception module 301 receives all of the data of the print job to make this determination, and the determination may be made at the point when the job control command portion is received. The job control command portion will be described later.

The job storage module 303 stores the print job received by the job reception module 301 as print data 305 in the HDD 204. The job storage module 303 uses a data interpretation module 304 to analyze the information of the print data and creates a piece of bibliographic information 306 in which the analysis result has been recorded. The bibliographic information includes information to specify the print data stored in the HDD 204. The job storage module 303 also stores the bibliographic information in the HDD 204. Note that it may be set so that the bibliographic information will be stored in the HDD 204 in a data structure which will allow a stored job control module 307 to conduct a search rapidly.

The data interpretation module 304 extracts at least some pieces of information of the print data to be included in the bibliographic information. The pieces of information to be extracted here are, for example, the job name, job owner information, page count, copy count, color information, and the like included in the print job. The data interpretation module 304 also extracts print settings that can be changed by a print data change module 308. The print settings that can be changed are, for example, the print range setting, the color setting, and the double-sided printing setting. The data interpretation module 304 may not only extract information from the job control command but also extract at least some pieces of information of print data to be included in the bibliographic information by interpreting the PDL data portion. The PDL data portion will be described later.

The stored job control module 307 displays, on the operation unit 211 connected to the operation unit I/F 210, a user interface screen which includes the plurality of pieces of bibliographic information stored in the HDD 204 based on the input from the operation unit I/F 210. The stored job control module 307 may display a user interface screen (for example, a login screen including a user ID and a password) used by the user to log in before the user interface screen is displayed. Alternatively, it may be set so that the user will be specified by card authentication using RFID or the like. When the user information can be specified, the stored job control module 307 selects, based on the specified user information, a corresponding piece of bibliographic information from the plurality of pieces of bibliographic information stored in the HDD 204 and displays the selected bibliographic information on the user interface screen.

In the user interface screen displayed by the stored job control module 307, at least one piece of bibliographic information can be selected and an instruction such as an instruction to start the printing of print data corresponding to this piece of bibliographic information can be accepted. The stored job control module 307 also transmits the print data to the print processing module 309. Before transmitting the print data to the print processing module 309, the stored job control module 307 may also change the print data in the print data change module 308 and transmit the changed print data. Furthermore, the stored job control module 307 updates the corresponding bibliographic information based on the information changed by the print data change module 308. The stored job control module 307 can also overwrite the print data in the HDD 204 by the print data changed by the print data change module 308.

The print data change module 308 executes print data change processing based on the received print data and the print setting information. The changed print data is stored temporarily in the RAM 203 or the HDD 204. The print processing module 309 executes print processing by performing rasterization processing on the print data transmitted from the job analysis module 302 or the stored job control module 307 and transmitting the generated bitmap data to the printer 207 via the printer I/F 206.

Figure 4:
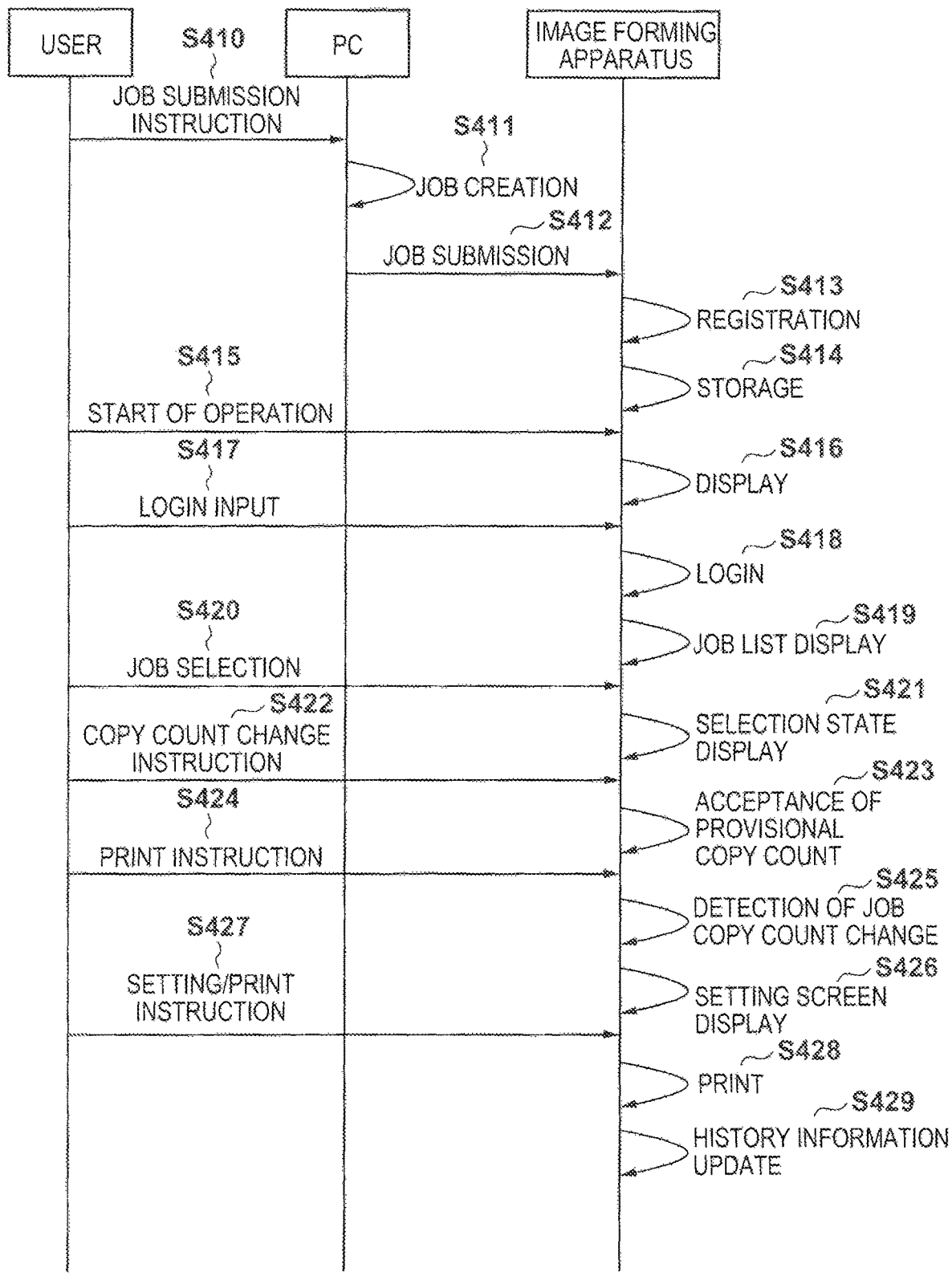
FIG. 4 is a sequence chart showing the overall sequence of print job processing.

FIG. 4 is a sequence chart for explaining the overall print job processing sequence of the image forming system. First, the PC 110 accepts (S410) an instruction from the user and generates (S411) a print job. Subsequently, the PC 110 submits (S412) the generated print job to the image forming apparatus 100. When the print job is submitted, the image forming apparatus 100 registers (S413) the print job by generating bibliographic information corresponding to the print job so that the received print job can be printed later. Subsequently, the received print job is stored (S414) in a storage device included in the image forming apparatus 100.

In the image forming apparatus 100 according to this embodiment, it is possible to make a hold OFF setting in which a print job received by the image forming apparatus 100 is directly printed and a hold ON setting in which the received print job is temporarily held and the printing of the held print job is started under the instruction of the user. If the hold ON setting has been made, the user can confirm the job name and the print settings of the held print job and preview the image of the held print job on the user interface screen. It is also possible to change the print settings, and for example, the copy count can be changed by input via a numeric keypad.

Next, after accepting an operation start instruction from the user (S415), the image forming apparatus 100 displays (S416) a login screen for the user to log in on the display of the operation unit 211. Next, upon accepting the login information input by the user (S417), the image forming apparatus 100 performs login processing (S418). Furthermore, the image forming apparatus 100 displays (S419) a list including the print job registered in step S413 on the user interface screen.

Next, upon accepting the selection of the print job by the user (S420), the image forming apparatus 100 sets the selected print job in a selected state and displays (S421) the user interface screen again. Next, upon accepting an instruction to change the copy count from the user (S422), the image forming apparatus 100 stores (S423) the accepted copy count change setting as a provisional copy count.

Next, upon accepting an instruction to print the selected print job (S424), the image forming apparatus 100 detects (S425) the change in the copy count of the selected print job and displays (S426) a setting screen on the display of the image forming apparatus 100. When the user makes a setting on the setting screen (S427), the image forming apparatus 100 executes (S428) the print processing based on the print settings changed in S423. Subsequently, the image forming apparatus 100 stores (S429) the print setting information used in the printing operation in step S428 as history information. If a new piece of history information is not stored here, a previously stored piece of history information will be updated. Note that although FIG. 4 described the case of a print job, a carbon copy job can also be included in the print job in this embodiment.

Figure 5A:
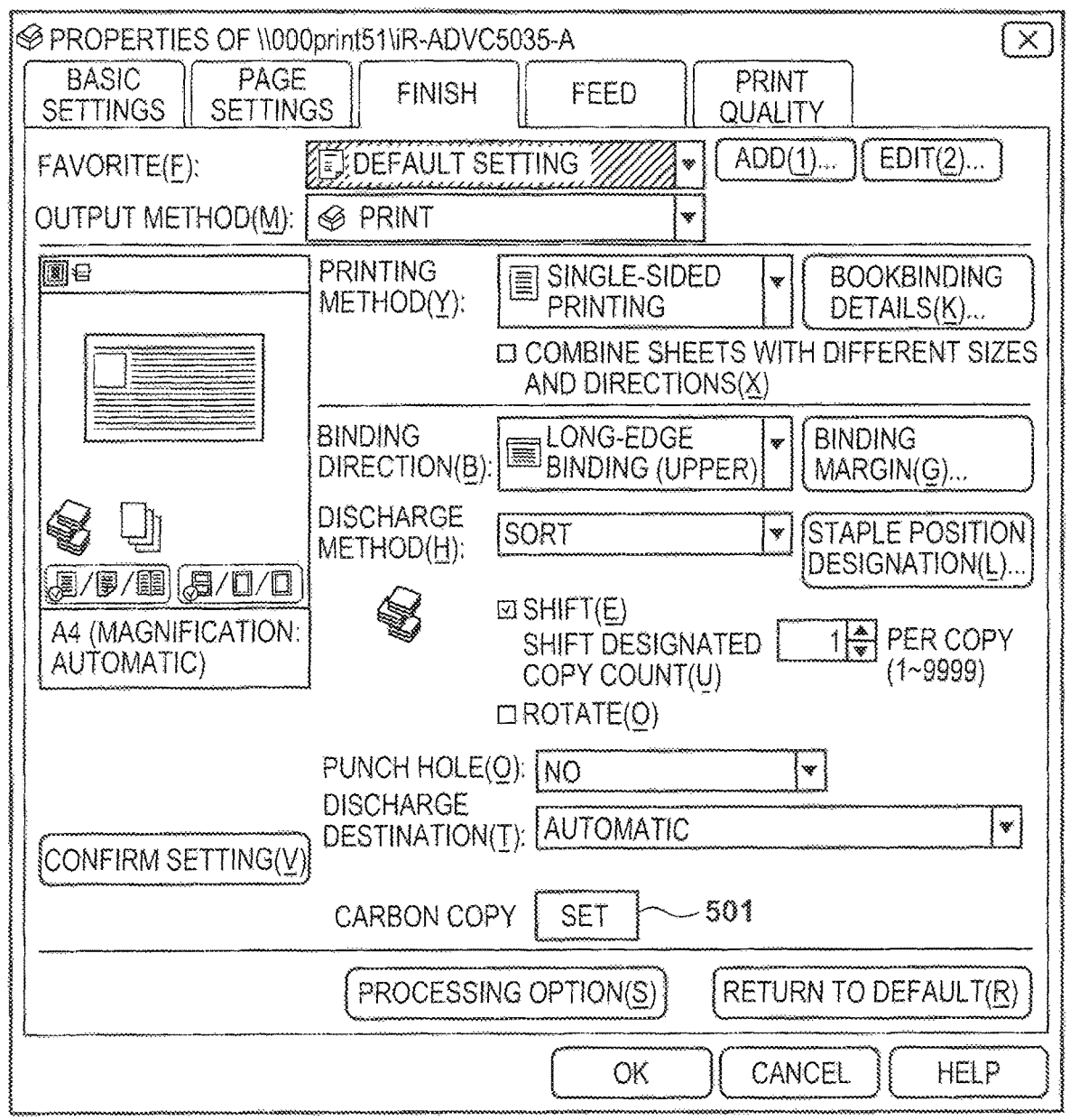
FIGS. 5A, 5B, and 5C are views each showing a UI screen of a printer driver.
Figure 5B:
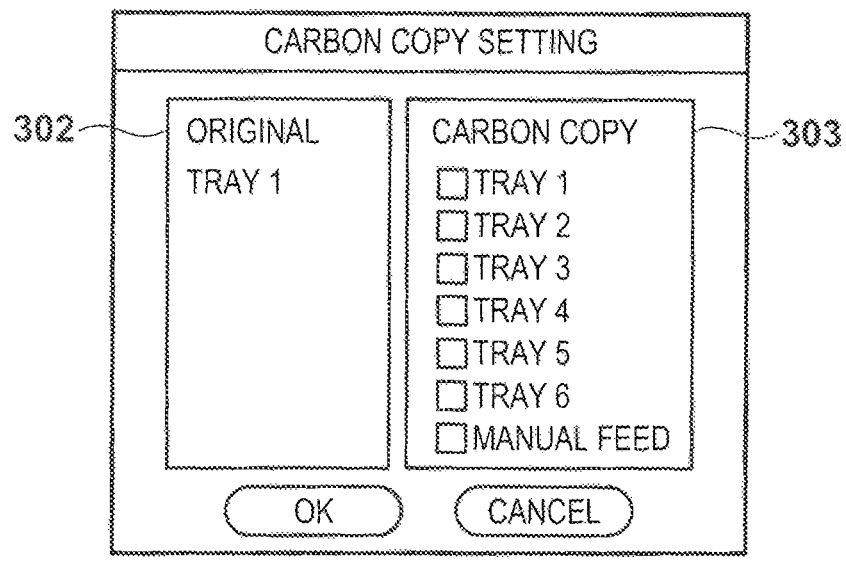
Figure 5C:
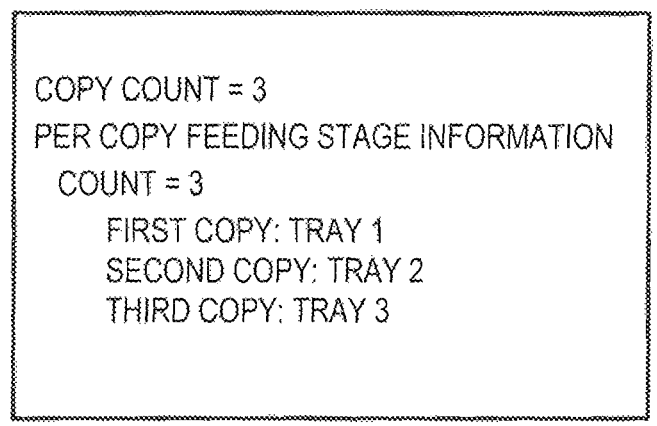

FIGS. 5A to 5C describe examples of a method of generating a carbon copy job in the printer driver of the PC 110. FIG. 5A shows a user interface screen (UI screen) of the printer driver installed in the PC 110. The screen shown in FIG. 5B is opened when a carbon copy setting button 501 is pressed.

FIG. 5B shows a screen for making detailed settings concerning a carbon copy job, and the output tray for the original copy is displayed in a display area 302. The designation of the output tray for each carbon copy is made in a display area 303, and feeding trays mounted to the image forming apparatus 100, excluding the output tray for the original copy, are displayed as selection options. Here, for example, if the user checks the check boxes for tray 2 and tray 3 and presses "OK", printing is executed by using sheets stored in tray 1 for the first copy which is the original copy, sheets stored in tray 2 for the second copy which is a carbon copy, and sheets stored in tray 3 for the third copy which is also a carbon copy.

FIG. 5C is a view showing an example of job control information related to a carbon copy operation included in the print job which is transmitted from the PC 110 to the image forming apparatus 100. FIG. 5C corresponds to the setting contents described for FIG. 5B. As shown in FIG. 5C, the copy count including the original copy and carbon copy, which is 3 in this case, is designated in the job control information. The job control information also includes, as feeding stage information for each copy, the count value of the designated tray count (feeding stage count). Since the designated feeding stage count is 3, 3 has been designated. Also, as the feeding stage information for each copy, the information of the feeding stage designated for each copy has been designated. Since tray 1 is designated for the original copy, tray 1 is designated for the first copy. Since tray 2 and tray 3 are designated for the carbon copies, tray 2 is designated for the second copy, and tray 3 is designated for the third copy.

Figure 6:
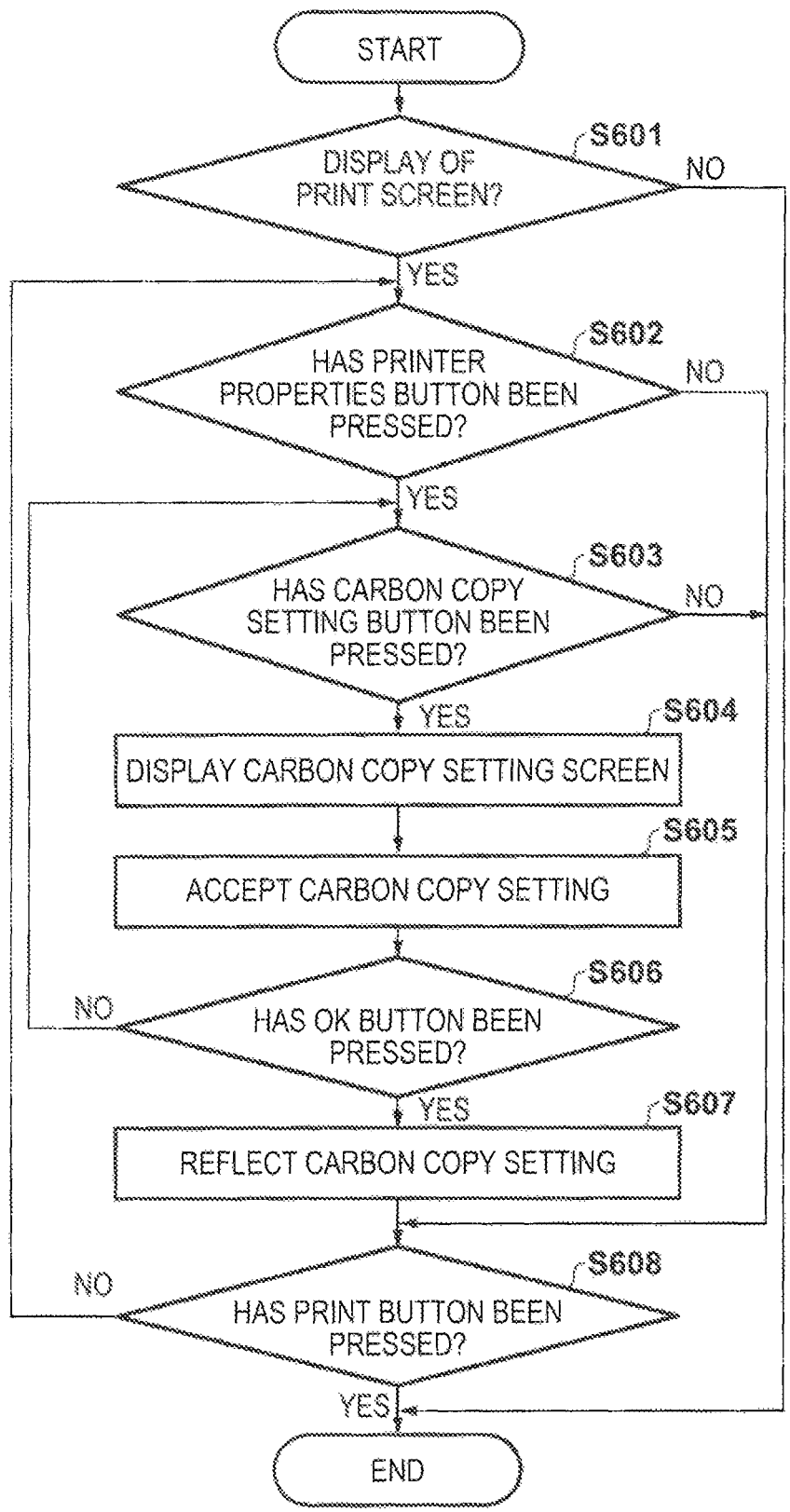
FIG. 6 is a flowchart illustrating processing to generate a carbon copy job.

FIG. 6 is a flowchart showing the processing to generate a carbon copy job in the PC 110. The processing of FIG. 6 is implemented when, for example, a program stored in the ROM 222 of FIG. 2B is loaded to the RAM 223 and the CPU 221 executes the loaded program.

In step S601, the CPU 221 determines whether the print screen has been displayed. If it is determined that the print screen has not been displayed, the processing of FIG. 6 ends. If it is determined that the print screen has been displayed, the CPU 221 determines, in step S602, whether a printer properties button has been pressed on the print screen. If it is determined that the printer properties button has not been pressed, the process advances to step S608. If it is determined that the printer properties button has been pressed, the CPU 221 determines, in step S604, whether the carbon copy setting button 501 has been pressed.

If it is determined that the carbon copy setting button 501 has not been pressed, the process advances to step S608. If it is determined that the carbon copy setting button 501 has been pressed, the CPU 221 displays, in step S604, the carbon copy setting screen shown in FIG. 5B and accepts, in step S605, the carbon copy setting.

In step S606, the CPU 221 determines whether the OK button on the carbon copy setting screen has been pressed. If it is determined that the OK button has not been pressed, the processing is repeated from step S603. If it is determined that the OK button has been pressed, the CPU 221 reflects, in step S607, the carbon copy setting to the print job. In step S608, the CPU 221 determines whether a print button on the print screen has been pressed. If it is determined that the print button has not been pressed, the processing is repeated from step S602. Otherwise, the processing of FIG. 6 ends.

Figure 7:
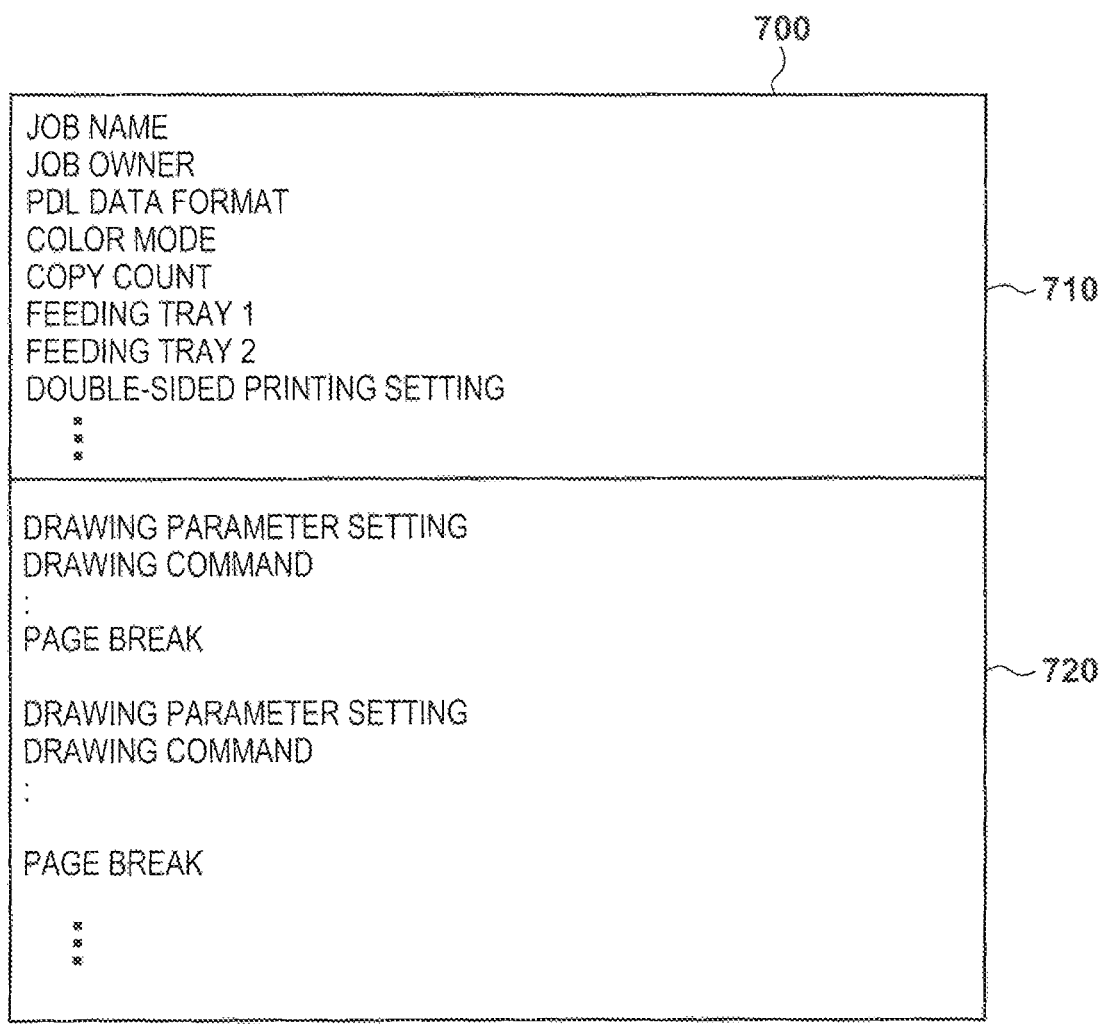
FIG. 7 is a view schematically showing a print job.

FIG. 7 is a schematic view of a print job (or print data stored in the HDD 204) which is received by the job reception module 301 of the image forming apparatus 100. A print job 700 is formed by a job control command portion 710 and a PDL portion 720. Attributes related to the overall print job and print settings are described in the job control command portion 710. For example, the job name of the print job, the owner of the print job, and format information of the PDL portion 720 are described in the job control command portion. The print settings of the print job are also described in the job control command portion 710. The print settings of the print job include, for example, the copy count, the setting for double-sided printing, and the like. For example, a drawing parameter setting command for setting a font to be used or the like, a drawing command, a page break command, and the like are described in the PDL portion 720. The data interpretation module 304 counts the number of page break commands in the PDL portion 720 to obtain the total page count included in the print data. The print data change module 308 changes the job control command portion 710 or the PDL portion 720 based on the contents of a change instruction.

Figure 8:
FIG. 8 is a view showing bibliographic information.

FIG. 8 is a view showing an example of bibliographic information in an XML format and the data structure used when storing the bibliographic information in the HDD 204. In this embodiment, the bibliographic information is stored, in the HDD 204, as a tree structure in which the user name is the root and each piece of bibliographic information is a leaf. Here, the user name is the job owner information itself described in the job control command portion 710, a part of the job owner information, or a character string that has been uniquely pre-assigned for each piece of owner information. The job storage module 303 determines the user name based on the owner information extracted by the data interpretation module 304, and stores the bibliographic information in an appropriate node.

Bibliographic information 820 is an example of the bibliographic information in an XML format. A description 821 is a part of the print data information extracted by the data interpretation module 304. Print setting contents that can be changed by the print data change module 308 are included in the description 821. A description 822 includes a print data status indicated in the bibliographic information 820. The print data status is, for example, information indicating whether the printing operation has been executed or not. A description 823 is print setting history information that indicates the print setting information which can be changed by the print data change module 308 and has been extracted from the print settings set when the corresponding print data had been printed previously. The print setting history information becomes the initial setting values of the print settings when the print data corresponding to the bibliographic information 820 is to be reprinted. Note that there may be a case in which the information that should be described in the description 821 of the bibliographic information is not described in the print job received by the job reception module 301. In this case, the job analysis module 302 will determine the information required for the description 821 of the bibliographic information 820.

FIGS. 9A and 9B are views each showing an example of a user interface screen displayed on the operation unit 211 of the image forming apparatus 100 when a carbon copy job has been held in the image forming apparatus 100. In the image forming apparatus 100, it is possible to make a hold OFF setting in which a print job received by the image forming apparatus 100 is directly printed and a hold ON setting in which the received print job is temporarily held and the printing of the held print job is started under the instruction of the user. If the hold ON setting has been set, the user can confirm the job name and the print settings of the held print job and confirm the image by preview on the screen shown in FIGS. 9A and 9B. It is also possible to change the print settings, and a change to the copy count can be accepted by input via a numeric keypad on a text box 910.

FIG. 9A is a view showing an example of a user interface screen that is generated by the stored job control module 307 in step S1003 of FIG. 10 (to be described later). Buttons 901 and 902 on a screen 900 are buttons for selecting the displayed print data. The button 901 is a button for displaying a list of unprinted print data, and the button 902 is a button for displaying a list of printed print data. A button 903 is a button for updating the screen 900. In each of display areas 904 and 905 that show a print data list, an area where the job name of the print data and information of a part of the print data described in the corresponding bibliographic information and a corresponding one of check boxes 906 and 907 for selecting the print data are included. Here, the print data displayed in the display area 904 is a print job with a carbon copy setting. The print data displayed in the display area 905 is a print job without the carbon copy setting.

A display area 908 displays total number of print data and the number of selected print data. A button 909 is a button to make all of the print data displayed on the list change to a selected state. The text box 910 is a text box to which the output copy count of the print data in the selected state is input. A button 911 is a button for confirming/changing the print setting of the print data in the selected state. A button 912 is a button for displaying a preview of the print data in the selected state. A button 913 is a button for deleting the print data in the selected state. A button 914 is a button for printing the print data in the selected state.

The stored job control module 307 controls the text box 910 so that it will be displayed when only one print data is selected. The stored job control module 307 sets the copy count set in the selected print data as the initial value in the text box 910. As shown in FIGS. 9A and 9B, a print job with a carbon copy setting and a print job without a carbon copy setting can be displayed in the same manner in a list.

The display control processing of the user interface screen shown in FIGS. 9A and 9B will be described. FIG. 10 is a flowchart illustrating the display control processing of the user interface screen shown in FIGS. 9A and 9B. The processing of FIG. 10 is, for example, implemented by the CPU 201 reading out a program stored in the ROM 202 to the RAM 203 and executing the readout program. However, it will be assumed that the stored job control module 307 on the program will execute each process in the description hereinafter.

The stored job control module 307 receives the user information via the operation unit I/F 210 and specifies the user (step S1001). The stored job control module 307 displays, for example, a user interface screen for inputting the user name and the password on an LCD (not shown) connected to the operation unit I/F 210, and reads the information input by the user in the user interface screen. Next, the stored job control module 307 sets the type of the print data which is to be a display target on the user interface screen to be generated (step S1002). In this embodiment, the stored job control module 307 can switch whether to display only unprinted print data or only printed print data as the print data to be displayed on the user interface screen. In this embodiment, it will be set so that only the unprinted print data will be displayed first. Note that among the pieces of bibliographic information stored in the HDD 204, the stored job control module 307 determines the aforementioned user name from the user information specified in step S1001 and extracts the bibliographic information corresponding to a print job node corresponding to the user name. Then, the stored job control module determines whether the print job has been printed from the contents described in the bibliographic information, and extracts, from the pieces of the bibliographic information, each job name of the bibliographic information matching the conditions, and displays each extracted name. Subsequently, the stored job control module generates a user interface screen which includes the plurality of extracted job names and displays the generated user interface screen (step S1003).

Next, the stored job control module 307 stands by until an input is accepted on the user interface screen (step S1004). If the input on the user interface screen is an input to change the type of the displayed print data (YES in step S1005), the stored job control module 307 switches the type of the print data to be displayed and updates the user interface screen (step S1006).

If an input on the user interface screen is an input to select the displayed print data (YES in step S1007), the stored job control module 307 changes the selected print data from an unselected state to a selected state or from a selected state to an unselected state (step S1008). Subsequently, the stored job control module 307 updates the user interface screen. The selection state of this print data is held in the HDD 204 until the stored job control module 307 ends the display of the user interface screen.

Figure 11A:
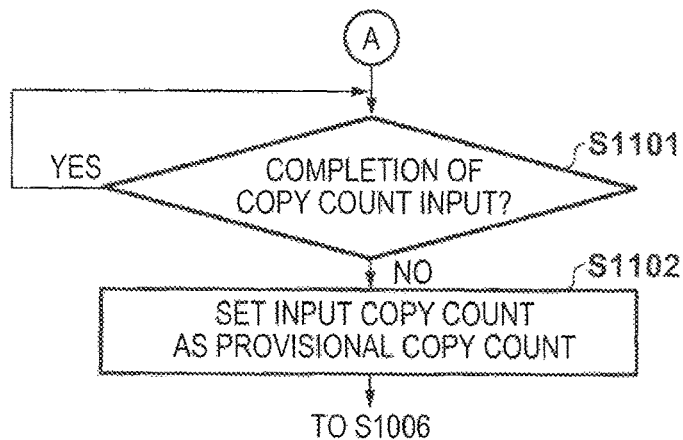
FIGS. 11A and 11B are flowcharts illustrating the UI-screen display control processing of the image forming apparatus.

Processes performed when the input on the user interface screen is an input to change the print copy count of the print data in the selected state (YES in step S1009) will be described later with reference to FIG. 11A. Processes performed when the input on the user interface screen is an input to print the print data in the selected state (YES in step S1010) will be described later with reference to FIG. 11B. Processes performed when the input on the user interface screen is an input to confirm/change the print settings of the print data in the selected state (YES in step S1011) will be described later with reference to FIG. 12.

If the input on the user interface screen is an input to delete the print data in the selected state (YES in step S1012), the stored job control module 307 deletes the selected print data and its corresponding bibliographic information from the HDD 204 (step S1013).

Figure 10:
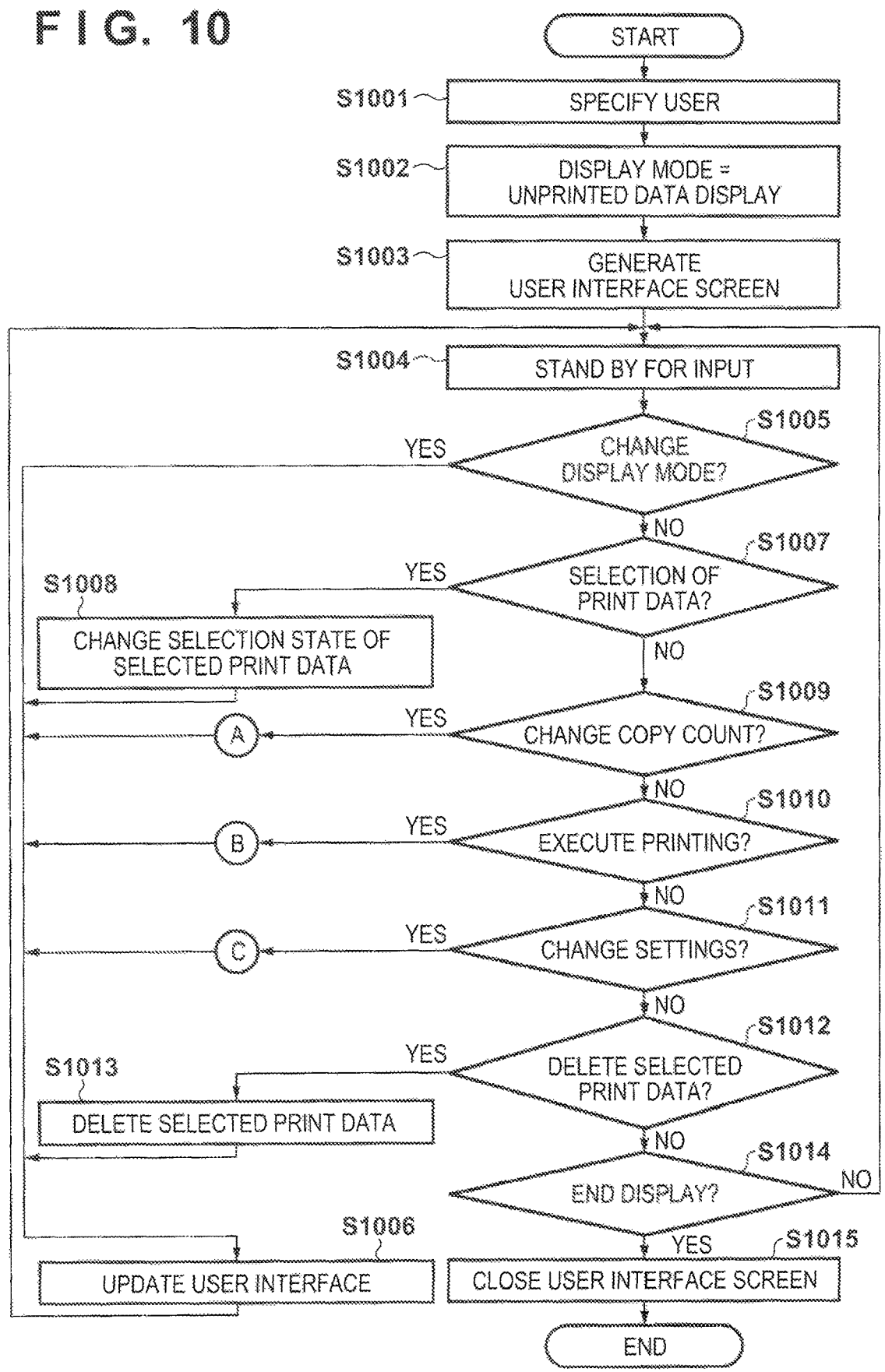
FIG. 10 is a flowchart illustrating UI-screen display control processing of the image forming apparatus.

If the input on the user interface screen is an input to end the display of the currently displayed user interface screen (YES in step S1014), the stored job control module 307 closes the displayed user interface screen and ends the processing of FIG. 10 (step S1015). If it is not an input to end the display of the currently displayed user interface screen in step S1014, the processing is repeated from step S1004.

Processing executed when the stored job control module 307 receives an input to change the print copy count of the print data in the selected state will be described next with reference to FIG. 11A.

When the stored job control module 307 detects the input of a numerical value to the text box 910 of FIG. 9A, the stored job control module 307 accepts the input of the copy count until the input of the copy count has been completed (step S1101). This is because the copy count is a numerical value and an input is accepted for each digit. For example, the copy count input may be determined to be complete, for example, when an input focus disappears from the text box 910. Alternatively, the copy count input can be determined to be complete when another type of input is detected. When the completion of the copy count input is detected, the stored job control module 307 stores the numerical value input in the text box 910 as a provisional copy count in the RAM 203 (step S1102). The provisional copy count is the parameter that is referred to by the stored job control module 307 when it detects that the button 914 for starting the printing operation has been pressed. After the process of step S1102, the process advances to step S1006.

Figure 11B:
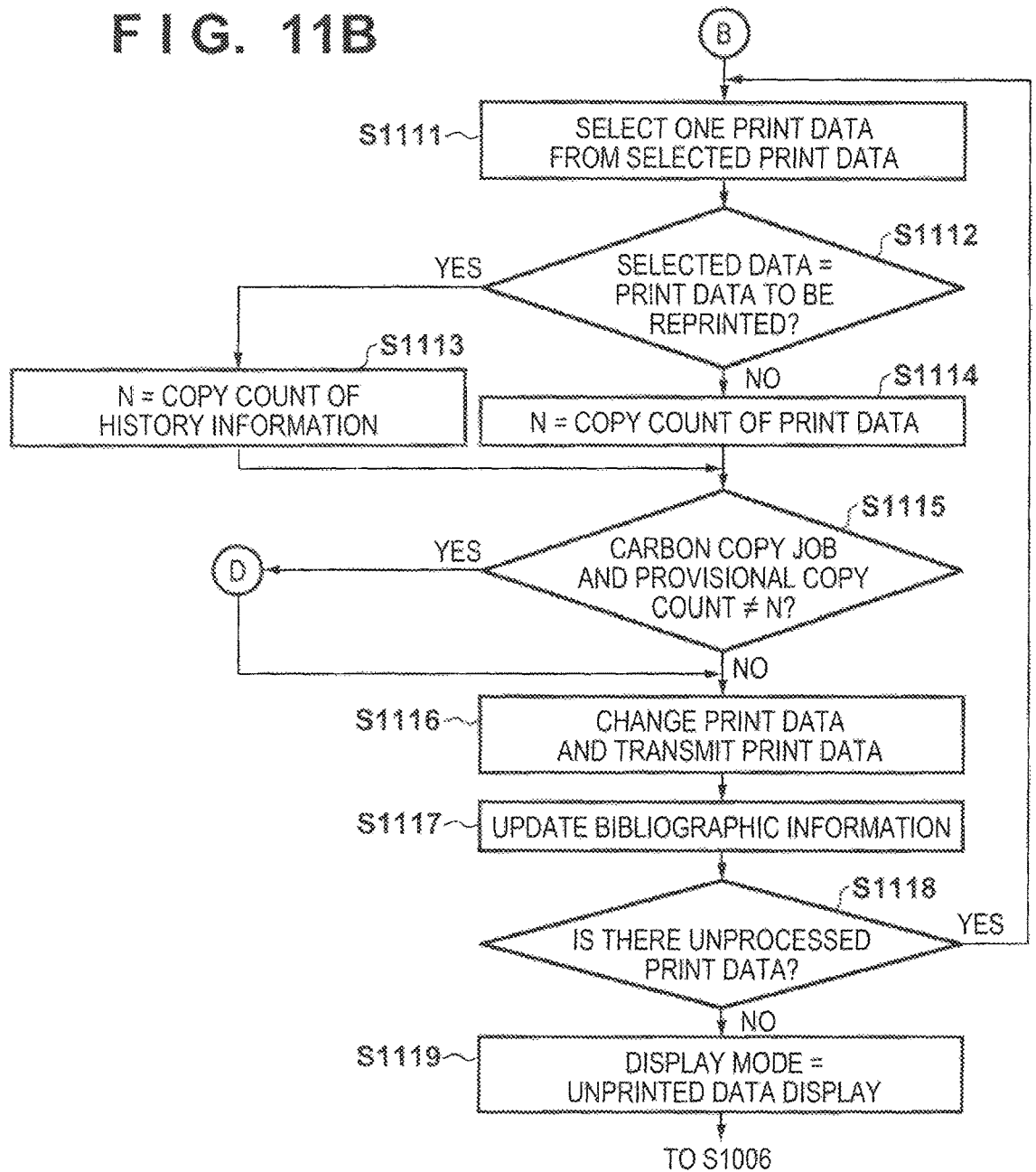

Processing executed when the stored job control module 307 receives an input for printing the print data in the selected state will be described next with reference to FIG. 11B.

If there are a plurality of print data in the selected state in the processing illustrated by the flowchart of FIG. 10, the stored job control module 307 selects en one print data (step S1111). For example, the order in which the print data were selected can be stored in the RAM 203, and the stored job control module can preferentially select the print data that was selected earlier. Next, the stored job control module 307 determines, based on the bibliographic information, whether the print data selected in step S1111 is printed print data (that is, print data to be reprinted) or unprinted print data (step S1112). If it is the print data to be reprinted, the stored job control module 307 obtains the copy count setting value from the print setting history information (the description 823 in FIG. 8) in the bibliographic information read from the HDD 204 (step S1113). On the other hand, if the print data is unprinted print data, the stored job control module 307 obtains the copy count setting value from the print data information (the description 821 in FIG. 8) in the bibliographic information (step S1114).

After step S1113 or step S1114, the stored job control module 307 compares the provisional copy count stored in the RAM 203 with the copy count obtained in step S1113 or step S1114 (step S1115). Here, if the set provisional copy count differs from the copy count value obtained in step S1113 or step S1114, a carbon copy setting (to be described later with reference to FIG. 13) will be performed. Subsequently, the set carbon copy setting and the print data are transmitted to the print data change module 308 and the print data is changed. Here, if printed print data has been selected as the target data, the print settings set in the print setting history information (the description 823 in FIG. 8) in the bibliographic information are also transmitted to the print data change module 308.

The stored job control module 307 transmits the print data, which has been changed in the manner described above, to the print processing module 309 (step S1116). Note that in a case in which the carbon copy setting has not been made and the printed print data has not been selected as the target data, the stored job control module reads the print data corresponding to the bibliographic information from the HDD 204 and transmits the read print data to the print processing module 309 without changing the print data. Next, the stored job control module 307 updates the print setting history information (the description 823 in FIG. 8) in the bibliographic information corresponding to the printed print data and the status (the description 822 in FIG. 8) of the print data (step S1117).

The above described processing is repeated for each selected print data (step S1118). When the processing of all of the print data has been completed, the stored job control module 307 switches the setting so that the type of the print data to be displayed on the user interface screen will be printed print data (step S1119). After step S1119, the process advances to step S1006.

Figure 12:
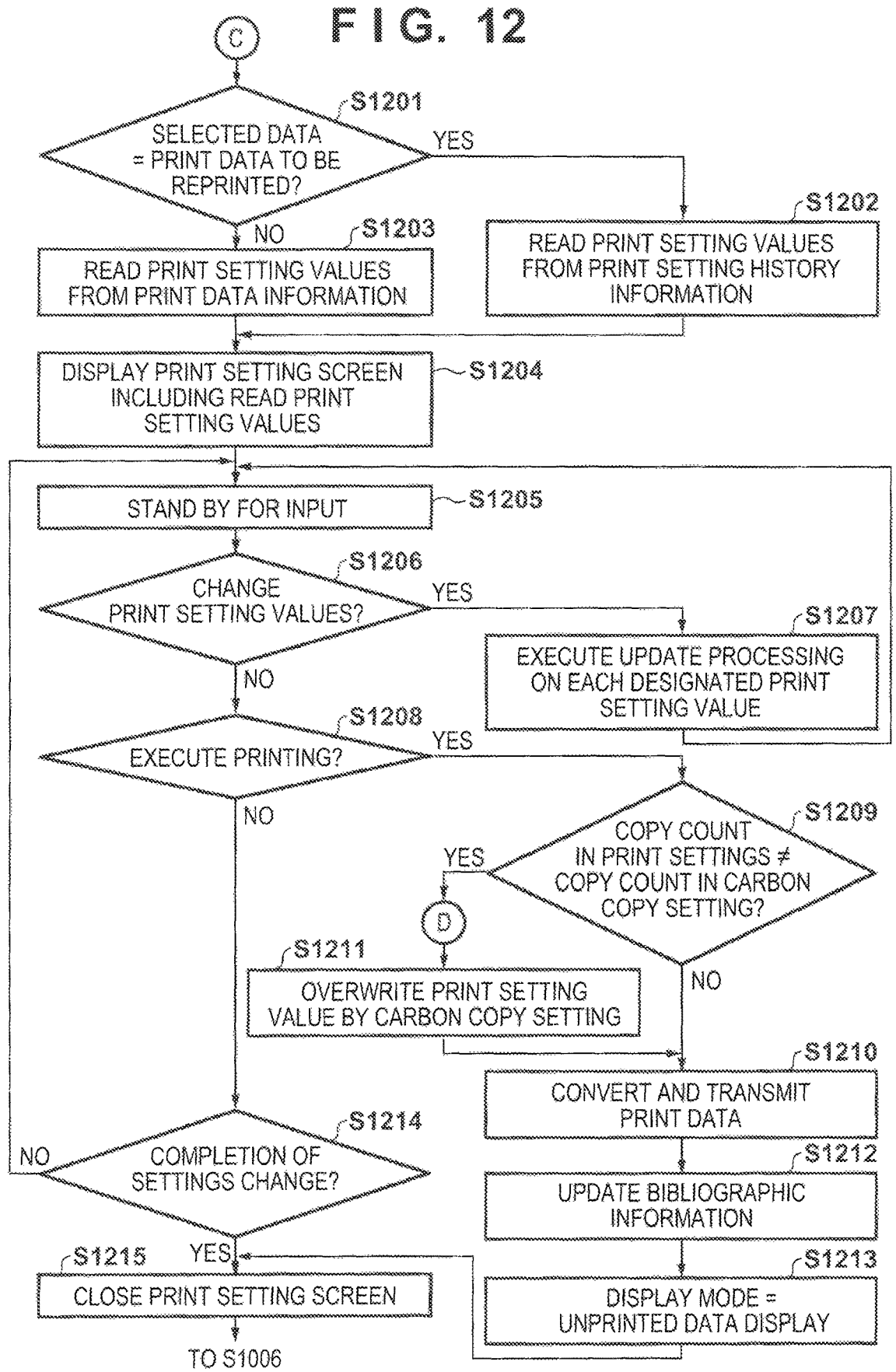
FIG. 12 is a flowchart illustrating the UI-screen display control processing of the image forming apparatus.

Processing executed when the stored job control module 307 receives an input to confirm/change the print setting of the print data in the selected state will be described next with reference to FIG. 12. Note that the print data change module 308 can execute the change processing of only one print data at a time. Hence, in a case in which a plurality of print data have been selected, the stored job control module 307 may control the user interface so that an input for changing the print settings will not be accepted.

The stored job control module 307 determines, from the bibliographic information corresponding to the designated print data, whether the designated print data is printed print data (that is, print data that is to be reprinted) or is unprinted print data (step S1201). If it is print data that is to be reprinted, the stored job control module 307 reads the print setting information from the print setting history information (the description 823 in FIG. 8) in the bibliographic information and stores the read print setting information in the RAM 203 (step S1202). On the other hand, if it is unprinted print data, the stored job control module 307 loads the print setting information from the print data information (the description 821 in FIG. 8) in the bibliographic information to the RAM 203 (step S1203). Next, based on the print setting information loaded to the RAM 203, the stored job control module 307 generates and displays the print setting screen which is the user interface screen to accept the print setting change (step S1204). Next, the stored job control module 307 stands by until it accepts an input on the print setting screen (step S1205).

If the input on the print setting screen is an input to change the print settings of the currently selected print data (YES in step S1206), the stored job control module 307 accepts the input by displaying a corresponding screen for changing each print setting. Subsequently, the stored job control module 307 changes the print setting information stored in the RAM 203 based on each accepted value (step S1207). Subsequently, the processing is repeated from step S1205.

If the input on the print setting screen is an input for printing the currently selected print data (YES in step S1208), the stored job control module 307 determines whether the copy count in the print setting differs from the copy count of the carbon copy setting (step S1209). If they differ, the stored job control module 307 performs the carbon copy setting (to be described later with reference to FIG. 13). The stored job control module 307 then overwrites the print setting information by the set carbon copy setting (step S1211). Subsequently, the stored job control module 307 transmits the selected print data and the above-described print setting information to the print data change module 308 and changes the print data. Subsequently, the changed print data is transmitted to the print processing module 309 (step S1210). In step S1209, if the copy count of the print settings and the copy count of the carbon copy setting are the same or if the print job is not a carbon copy job, the process advances to step S1210.

Next, based on the above-described print setting information, the stored job control module 307 updates the print setting history information (the description 823 in FIG. 8) in the corresponding bibliographic information. Furthermore, the stored job control module 307 updates the status (the description 822 in FIG. 8) of the print data (step S1212). Subsequently, the stored job control module 307 switches the setting so that the type of the print data to be displayed on the user interface screen will be set to printed print data (step S1213).

If the input on the print setting screen is not an input to print the selected print data but is an input to close the print setting screen (step S1214), or if the series of processes of the print processing has been executed, the stored job control module 307 closes the print setting screen (step S1215). After step S1215, the process advances to step S1006.

Processing executed when the stored job control module 307 is to make a carbon copy setting will be described next with reference to FIG. 13.

The stored job control module 307 generates a screen including a message expressing the necessity of the execution of the carbon copy setting and displays the generated screen (step S1301). Next, the stored job control module 307 generates and displays a user interface screen to make the carbon copy setting (step S1302). Here, the user interface screen for the carbon copy setting is generated based on the print settings of the selected print job and the copy count which has been set separately by the user. This user interface screen displays the feeding stage set for each set copy. The user interface screen will display that the feeding stage has not been configured for a copy without a feeding stage setting. In this user interface screen, a feeding stage can be set for each copy and the copy count can be changed. Next, the stored job control module 307 stands by until it accepts an input on the user interface screen (step S1303).

If the input on the user interface screen is an input to change the feeding stage setting of a specific copy (YES in step S1304), the stored job control module 307 displays a feeding stage selection screen and accepts the setting of a feeding stage with respect to the corresponding copy (step S1305). Subsequently, the processing is repeated from step S1303.

If the input on the user interface screen is an input to change the copy count (YES in step S1306), the stored job control module 307 changes the copy count in accordance with the input (step S1307). Subsequently, the processing is repeated from step S1303.

If the input on the user interface screen is an input to complete the carbon copy setting (YES in step S1308), the stored job control module 307 determines whether the feeding stage setting has been made for all of the copies (step S1309). If the feeding stage setting has not been made for all of the copies, the stored job control module 307 repeats the processing from step S1301. Otherwise, the processing of FIG. 13 ends.

Figure 13:
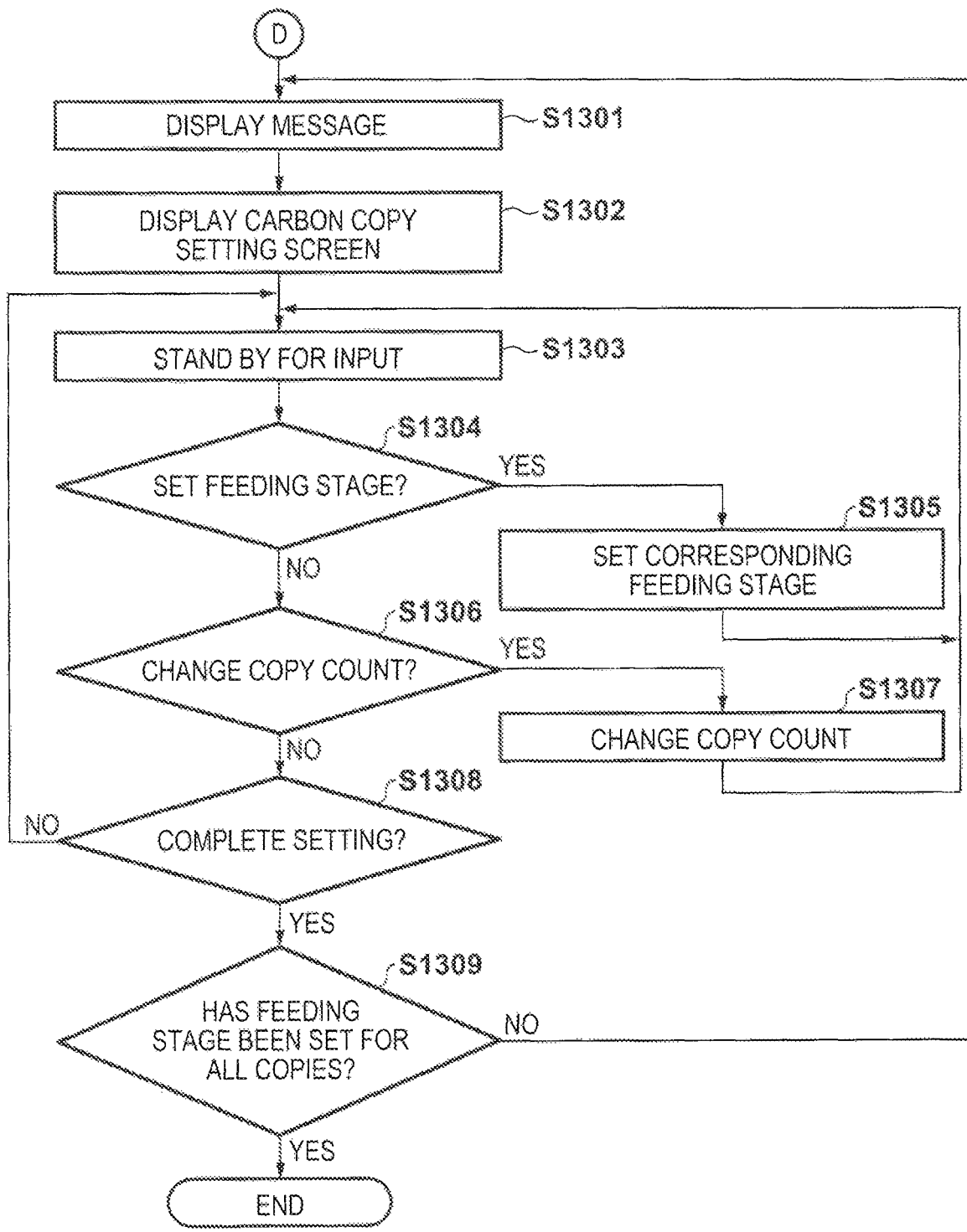
FIG. 13 is a flowchart illustrating the UI-screen display control processing of the image forming apparatus.
Figure 14:
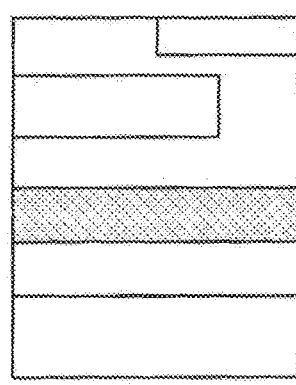
FIGS. 14A, 14B, and 14C are views each showing a carbon copy setting screen.

FIGS. 14A to 14C are views each showing an example of a screen related to the carbon copy setting which is generated by the stored job control module 307. FIG. 14A is a view showing an example of a message to be displayed in step S1301 of FIG. 13. As shown in FIG. 14A, in a case in which the provisional copy count obtained in step S1115 of FIG. 11B differs from the copy count of the print data, or in a case in which the copy count of the print settings in step S1209 of FIG. 12 differs from the copy count of the carbon copy count setting, a message that says, "The carbon copy setting is inadequate. Please set a feeding stage for every copy." will be displayed.

FIG. 14B is view showing an example of a user interface screen for the carbon copy setting, and is displayed in step S1302 of FIG. 13. A display area 1401 is an area where the information of the print data whose carbon copy setting is to be changed is displayed. A check box 1402 is a check box for selecting whether to execute the carbon copy printing operation. A list 1403 is a list which displays the feeding stage set of each copy. This list 1403 further includes, for each copy, a button 1404 for changing the feeding stage setting and a button 1405 for deleting. A slider bar 1406 is a slider bar for adjusting the position of the displayed list when the list 1403 cannot be included in a single screen. A button 1407 is a button to add a copy count. A button 1408 is button to end the carbon copy setting.

Upon detecting that the button 1404 has been pressed, the stored job control module 307 displays a feeding stage selection screen as shown in FIG. 14C. The screen shown in FIG. 14C includes a button 1411 accepting the selection of a feeding stage, an image 1412 to visually display the selected feeding stage, and a button 1413 to end the selection of the feeding stage. For example, consider a case in which printing is to be executed by changing the copy count set in the carbon copy setting of the print data from 2 to 3 in step S1009 of FIG. 10. In this case, in addition to the two copies preset in the carbon copy setting, one copy in the carbon copy setting whose feeding stage has not been set yet is also displayed in the list 1403. As result, the user can set the feeding stage for the one copy in carbon copy settings whose feeding stage has not been set yet via the screen shown in FIG. 14C.

Figure 15:
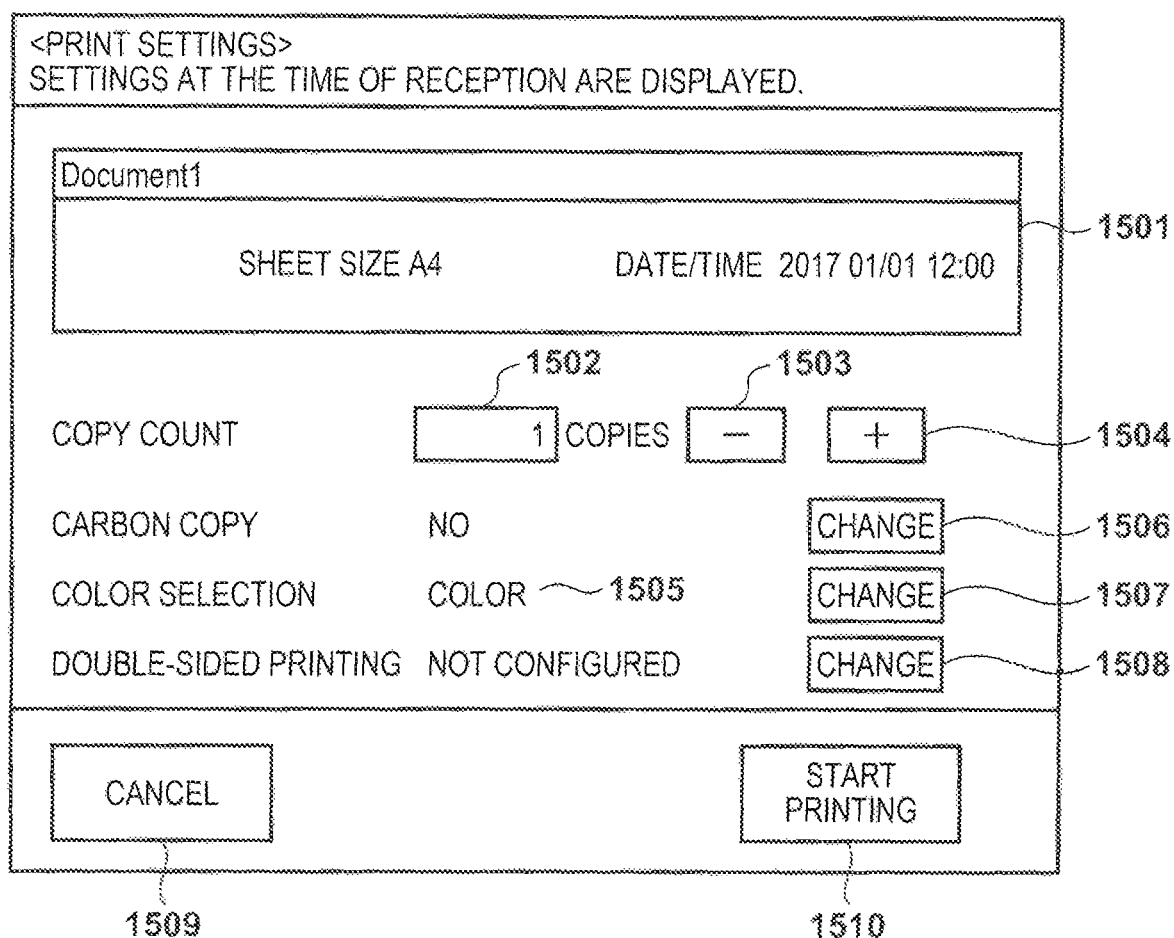
FIG. 15 is a view showing a print setting screen.

FIG. 15 is a view showing an example of a user interface screen to accept the print setting change generated by the stored job control module 307. The screen shown in FIG. 15 is displayed when the button 911 shown in FIG. 9A is pressed. A display area 1501 is an area for displaying a piece of setting information which will not be changed among the pieces of information of the print data. A display area 1502 is an area for displaying the copy count in the print settings. Buttons 1503 and 1504 are buttons for changing the copy count in the print settings. The copy count is decremented by 1 when the button 1503 is pressed, and the copy count is incremented by 1 when the button 1504 is pressed. A display area 1505 is an area for displaying the currently set print setting information. A button 1506 is a button for changing the carbon copy setting. A button 1507 is a button for changing the color setting in the print setting information. A button 1508 is a button for changing the double-sided printing setting in the print setting information. A button 1509 is a button for closing the print setting screen. A button 1510 is a button for printing the selected print data.

When the button 1506 is pressed, the stored job control module 307 displays the carbon copy setting screen shown in FIG. 14B, and becomes capable of accepting the carbon copy setting. On the other hand, the stored job control module can also accept a change to the copy count via the buttons 1503 and 1504. In this case, the stored job control module 307 confirms, upon detecting that the button 1510 has been pressed, whether there is inconsistency in the carbon copy setting and the copy count setting, and displays the screen shown in FIG. 14A if there is an inconsistency, and causes the user to make the carbon copy setting by the screen shown in FIG. 14B.

As described above, according to this embodiment, it is possible to change the copy count of a print job with a carbon copy printing setting in the same manner as a print job without a carbon copy print setting. That is, the user can handle a print job with a carbon copy setting in the same manner as a print job without a carbon copy setting, and thus the usability can be improved.

Here, there may be a situation in which the copy count set by the user and the carbon copy setting becomes inconsistent by allowing the user to change the copy count of a carbon copy job that has been held in the image forming apparatus. However, in this embodiment, if there is an inconsistency between the copy count set by the user and the carbon copy setting, a message regarding this state is displayed, and a screen for making the carbon copy setting is displayed. Therefore, even if it is possible to change the copy count of a print job with a carbon copy setting in the image forming apparatus, a hold printing operation can be performed by setting an appropriate copy count.

Second Embodiment

Figure 16A:
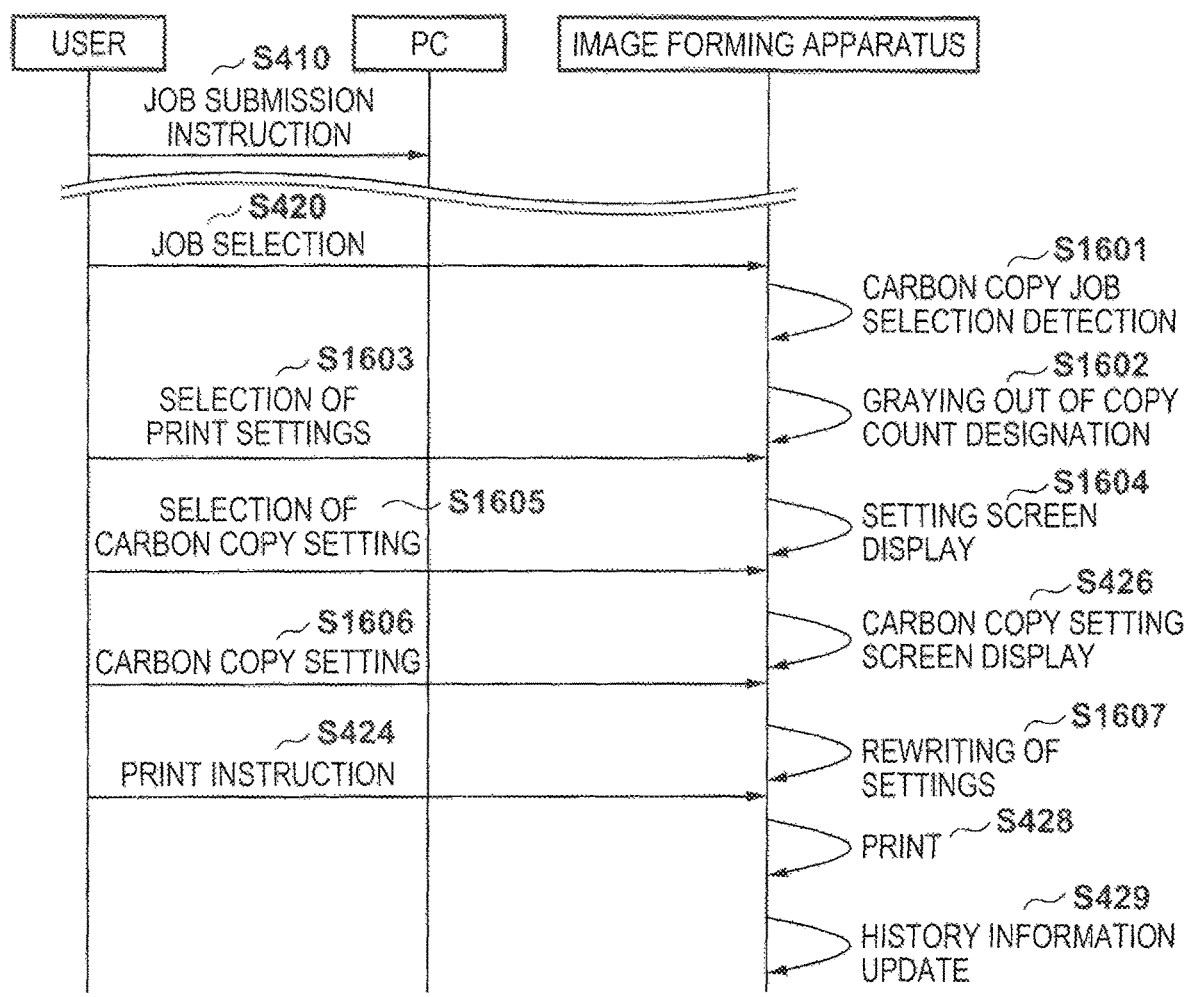
FIGS. 16A and 16B are sequence charts each showing the overall sequence of print job processing.
Figure 16B:
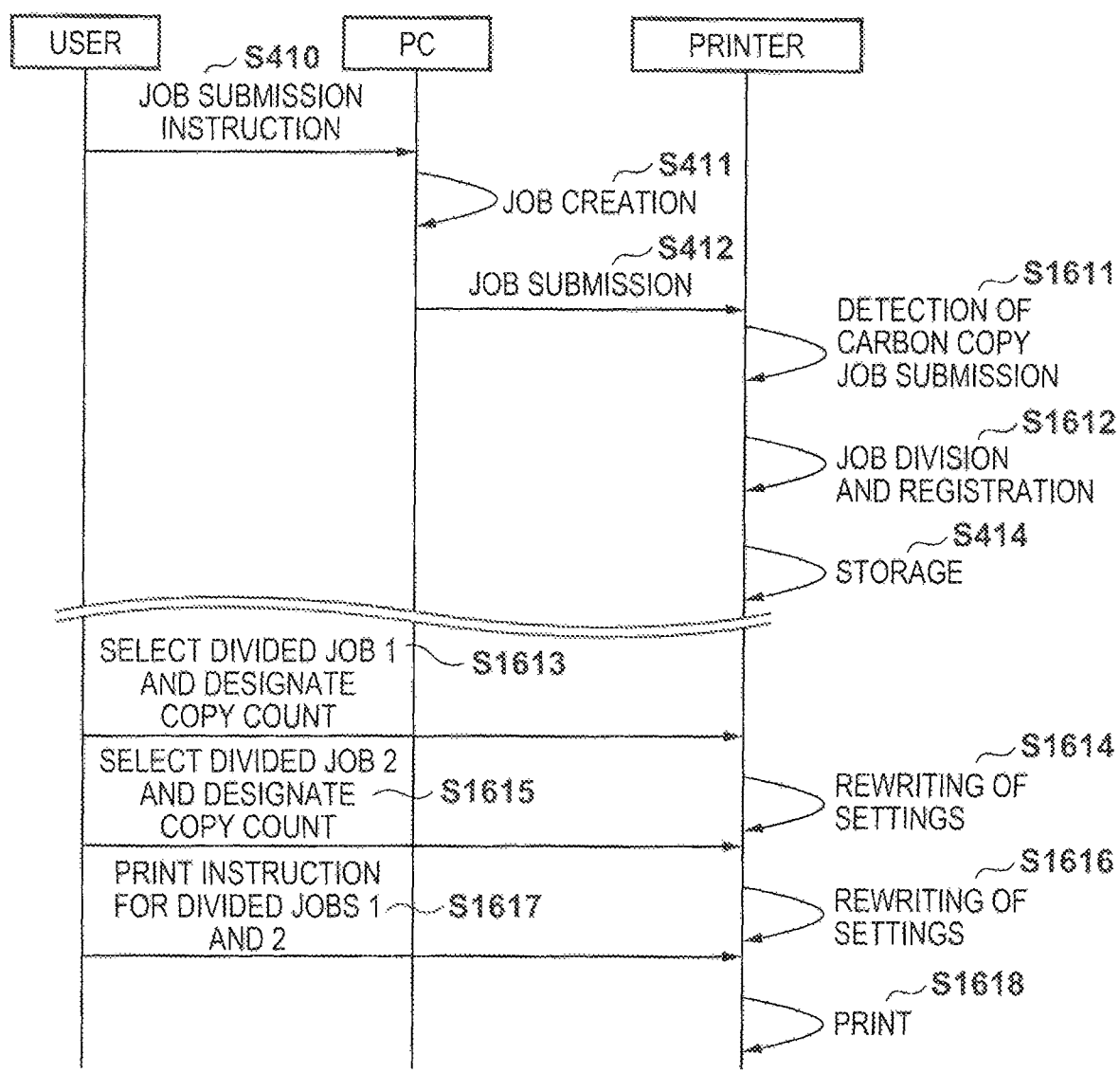

Points different from those in the first embodiment will be described in the second embodiment hereinafter. FIGS. 16A and 16B are sequence charts for explaining the overall print job processing sequence in an image forming system according to the second embodiment.

When a user selects (S420) a print job with a carbon copy setting on a screen displaying a print job list, an image forming apparatus 100 detects that a print job with a carbon copy setting has been selected (S1601). The image forming apparatus 100 then changes a text box 910 for changing the copy count, which is arranged on the screen displaying the print job list, into a writing disabled state so that a copy count change via the text box 910 will be prohibited (S1602).

To allow the user to change the carbon copy setting, a notification to change the print setting is transmitted (S1603). The image forming apparatus 100 then displays (S1604) a setting screen to change the overall print settings of the print job with the carbon copy setting. The screen which is displayed at this time is a print setting screen as shown in FIG. 15. When the user operates the print setting screen and makes an instruction to change the carbon copy setting (S1605), the image forming apparatus 100 displays (S426) a carbon copy setting screen for changing the carbon copy setting. The screen that is displayed at this time is the carbon copy setting screen shown in FIG. 14B. The user can make inputs to the carbon copy setting screen to instruct the carbon copy setting (S1606).

The image forming apparatus 100 holds the instructed carbon copy setting (S1607), and performs print processing (S429), based on an print instruction from the user (S424), in accordance with the carbon copy setting held in S1607.

The display control processing of the user interface screen of FIGS. 9A and 9B according to this embodiment will be described below with reference to FIG. 10.

If the input on the user interface screen is an input to select the displayed print data (YES in step S1007), a stored job control module 307 changes the selected print data from an unselected state to a selected state or from a selected state to an unselected state (step S1008). Subsequently, the stored job control module 307 updates the user interface (S1006). At this time, in this embodiment, if a plurality of print jobs have been selected or if the selected print job has a carbon copy setting, the stored job control module 307 changes the text box 910 to a state in which input acceptance is disabled as shown in FIG. 9B. The stored job control module 307 can notify the user that the copy count setting cannot be changed by graying out the text box 910. Note that the stored job control module 307 will determine, based on the bibliographic information, whether the print job that is to be displayed in step S1003 has a carbon copy setting, and stores this piece of information in a RAM 203 as the flag information for each print job. As a result, the stored job control module 307 can rapidly determine whether the selected print job has a carbon copy setting.

As described above, according to this embodiment, it is possible to display, before the print instruction, whether the print job has a carbon copy setting on the user interface screen so that it can be easily recognized by the user. In addition, it is possible to avoid a state in which the copy count set by the user and the carbon copy setting become inconsistent due to an erroneous copy count change operation.

Third Embodiment

Points different from those in the first and second embodiments will be described in the third embodiment hereinafter. FIG. 16B is a sequence chart for explaining the overall print job processing sequence in an image forming system according to the third embodiment.

When a print job is submitted, an image forming apparatus 100 detects (S1611) whether the submitted print job is a carbon copy job. If it detects that the print job is a carbon copy job, the image forming apparatus 100 divides the received print job based on the carbon copy setting and registers the print job as a held print job (S1612). For example, if two copies are set in the carbon copy setting, it will be registered here as two held print jobs, that is, divided job 1 and divided job 2. When the user selects divided job 1 and designates the copy count (S1613), the image forming apparatus 100 updates the copy count setting of divided job 1 (S1614). When the user selects divided job 2 and designates the copy count (S1615), the image forming apparatus 100 updates the copy count setting of divided job 2 (S1616). When the user makes an instruction to print divided jobs 1 and 2, the image forming apparatus 100 executes print processing based on the respective copy count designations described above.

FIG. 17A is a view showing an example of a user interface screen generated by a stored job control module 307 according to this embodiment. The user interface screen shown in FIG. 17A differs from those shown in FIGS. 9A and 9B in the point of the print job list display method. A display area 1701 shows the first copy of a print job with a carbon copy setting. A display area 1702 shows the second copy of the same print job with the carbon copy setting as that shown in the display area 1701.

Thus, in this embodiment, a print job with a carbon copy setting is divided on a copy basis and displayed in a list so that various kinds of print settings, including the copy count, can be set in the same manner as a print job without a carbon copy setting. FIG. 17B shows a state in which a carbon copy job has been divided and registered. A print job input as a carbon copy job in bibliographic information 1710 is divided and registered as bibliographic information 1711 and bibliographic information 1712.

In this embodiment, a job storage module 303 determines whether a print job that has been received at the time of print job reception is set with a carbon copy setting. If the print job has a carbon copy setting, bibliographic information is generated for each copy designated in the carbon copy setting. This processing will be described with reference to the flowchart of FIG. 18A.

Figure 18A:
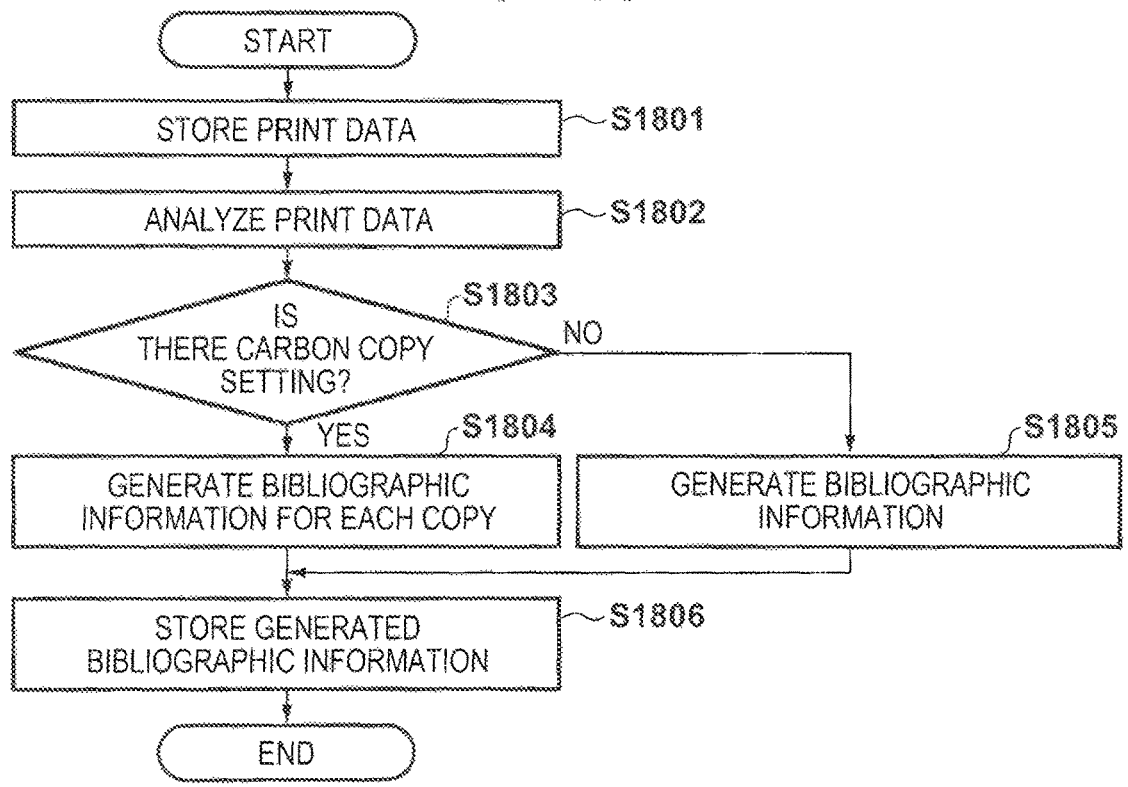
FIGS. 18A and 18B are flowcharts each illustrating processing to generate bibliographic information for each copy.

FIG. 18A is flowchart illustrating processing to generate bibliographic information for each copy in the carbon copy setting. The processing illustrated in FIG. 18A is, for example, implemented by a CPU 201 reading out a program stored in a ROM 202 and executing the program. However, it will be assumed that the job storage module 303 on the readout program will execute each process in the description hereinafter.

The job storage module 303 stores the received print job as print data in an HDD 204 (step S1801). Next, the job storage module 303 analyzes the information of the stored print data by using a data interpretation module 304 (step S1802). If it is determined, based on the analysis result, that a carbon copy setting has been made on the print data (YES in step S1803), the job storage module 303 generates bibliographic information for each copy in the carbon copy setting (S1804). In the generation of the bibliographic information, the carbon copy setting is deleted and a feeding stage setting corresponding to each copy is added instead. In addition, the job name attribute may be further changed. In this embodiment, the copy count information is added to the job name attribute. For example, "the first copy of" is added as a character string to the job name of the bibliographic information corresponding to the first copy.

On the other hand, bibliographic information is generated in the same manner as the other embodiments for print data that does not have a carbon copy setting (S1805). Next, the job storage module 303 stores the generated bibliographic information in the HDD 204 (step S1806).

The operation of the stored job control module 307 according to this embodiment will be described next with reference to FIGS. 18B and 19. The processing illustrated in FIG. 19 is, for example, implemented by the CPU 201 reading out a program stored in the ROM 202 to a RAM 203 and executing the program. However, it will be assumed that the stored job control module 307 on the readout program will execute each process in the description hereinafter.

Figure 18B:
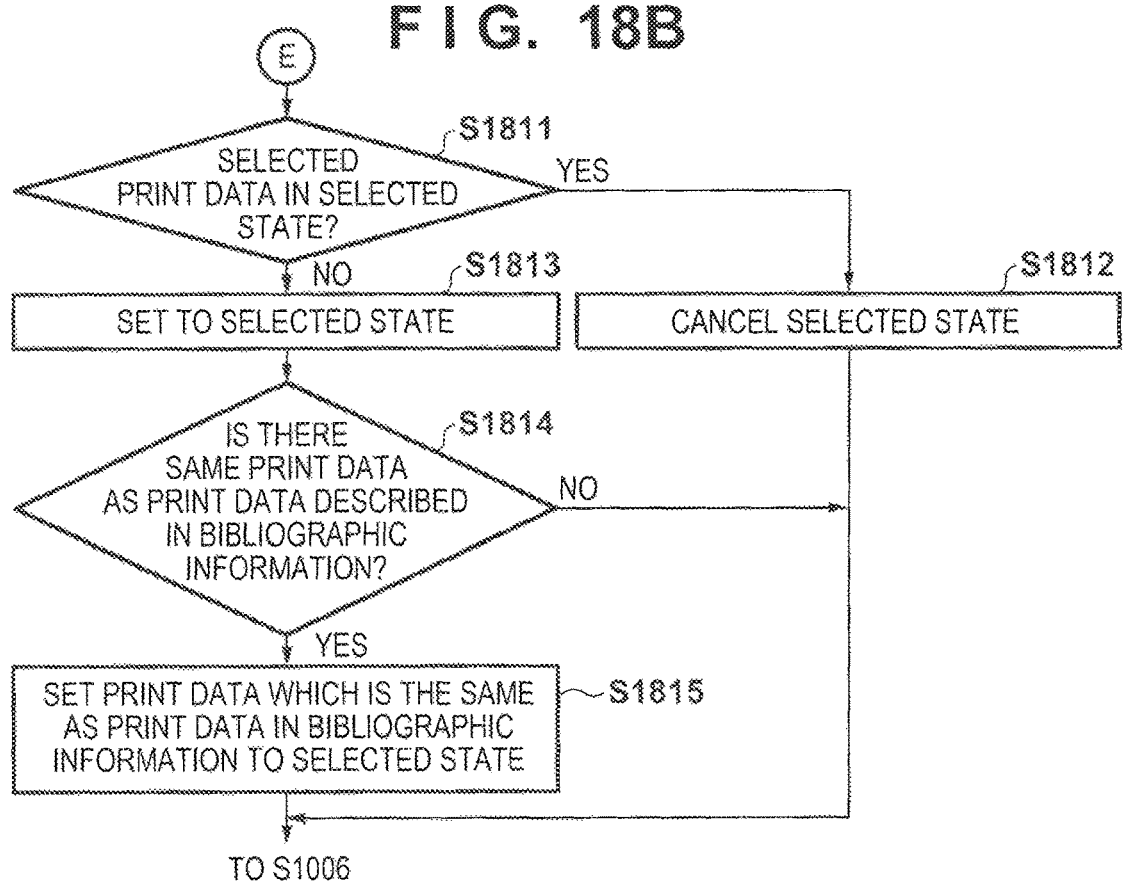
Figure 19:
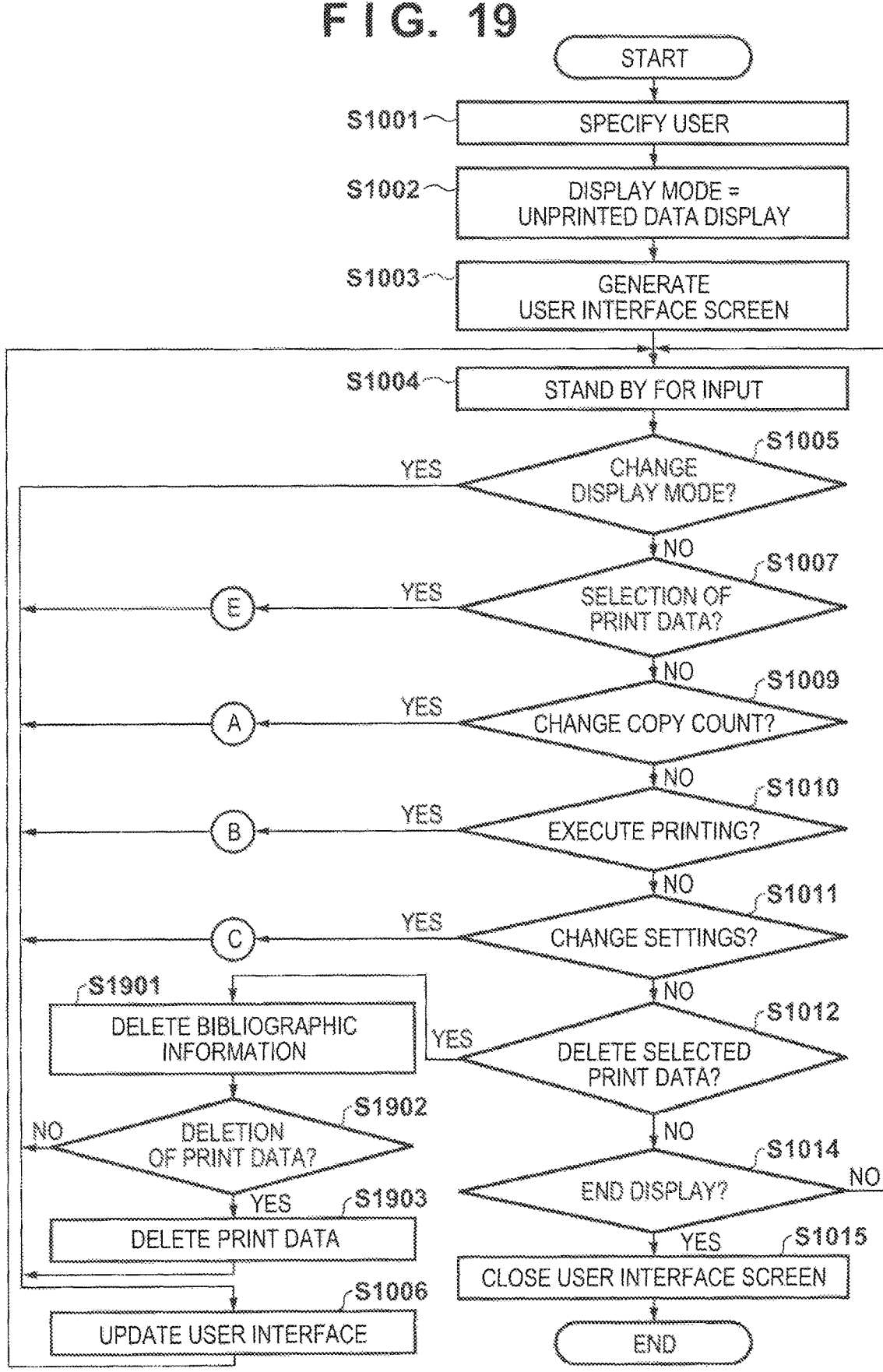
FIG. 19 is a flowchart illustrating UI-screen display control processing of the image forming apparatus.

In the processing illustrated in FIG. 19, if the input on the user interface screen is an input to select the displayed print data (YES in step S1007), the processing illustrated in FIG. 18B is executed.

The processing of FIG. 18B will be referred here. The stored job control module 307 confirms whether the selected print data is in a selected state (step S1811). If the print data is in a selected state, the stored job control module 307 cancels the selected state of the designated print data (step S1812). If the print data is not in a selected state, the stored job control module 307 sets the selected print data to a selected state (step S1813).

Next, the stored job control module 307 searches (step S1814) the print data displayed on the user interface screen for bibliographic information which is set with the same print data as the print data set in the bibliographic information corresponding to the print data that has been set to the selected state. When the print data is discovered, the stored job control module 307 changes the discovered print data to the selected state (step S1815). After step S1815, the process advances to step S1006 of FIG. 19.

The processing of FIG. 19 will be referred again. If the input on the user interface screen is an input to delete the print data in the selected state (step S1012), the stored job control module 307 deletes the bibliographic information corresponding to the selected print data from the HDD 204 (step S1901). Next, the stored job control module 307 determines whether the print data can be deleted from the HDD 204 (step S1902). That is, the stored job control module searches, in the HDD 204, for bibliographic information that has been set with the same print data as the print data stored in the HDD 204 and has been set in the bibliographic information corresponding to the print data which was deleted in step S1901. When bibliographic information as that described above is discovered, the stored job control module 307 determines that the print data can be deleted from the HDD 204, and deletes the print data corresponding to the discovered bibliographic information (step S1903). On the other hand, if bibliographic information as that described above is not discovered, the process advances from step S1902 to step S1006.

As described above, according to this embodiment, it is possible to handle a print job with a carbon copy setting as separate print jobs for each copy. As a result, print settings can be made in the same manner as those for print jobs other than the print job with a carbon copy setting, and the consistency between the copies and the feeding stage count that had been designated in the carbon copy job can be maintained, even if the user changes the copy count on the image forming apparatus.

Also, in a case in which a print job is divided into a plurality of print jobs by the carbon copy setting, if one print job is selected from the divided print jobs, other divided print jobs will be also selected. As a result, even after the division, the divided print jobs can be printed together at once in the same manner as a print job with a carbon copy setting. Furthermore, even after the division, the divided print jobs can be deleted together at once in the same manner as a print job with a carbon copy setting.

Fourth Embodiment

Points different from those in the first to third embodiments will be described in the fourth embodiment hereinafter.

Figure 20:
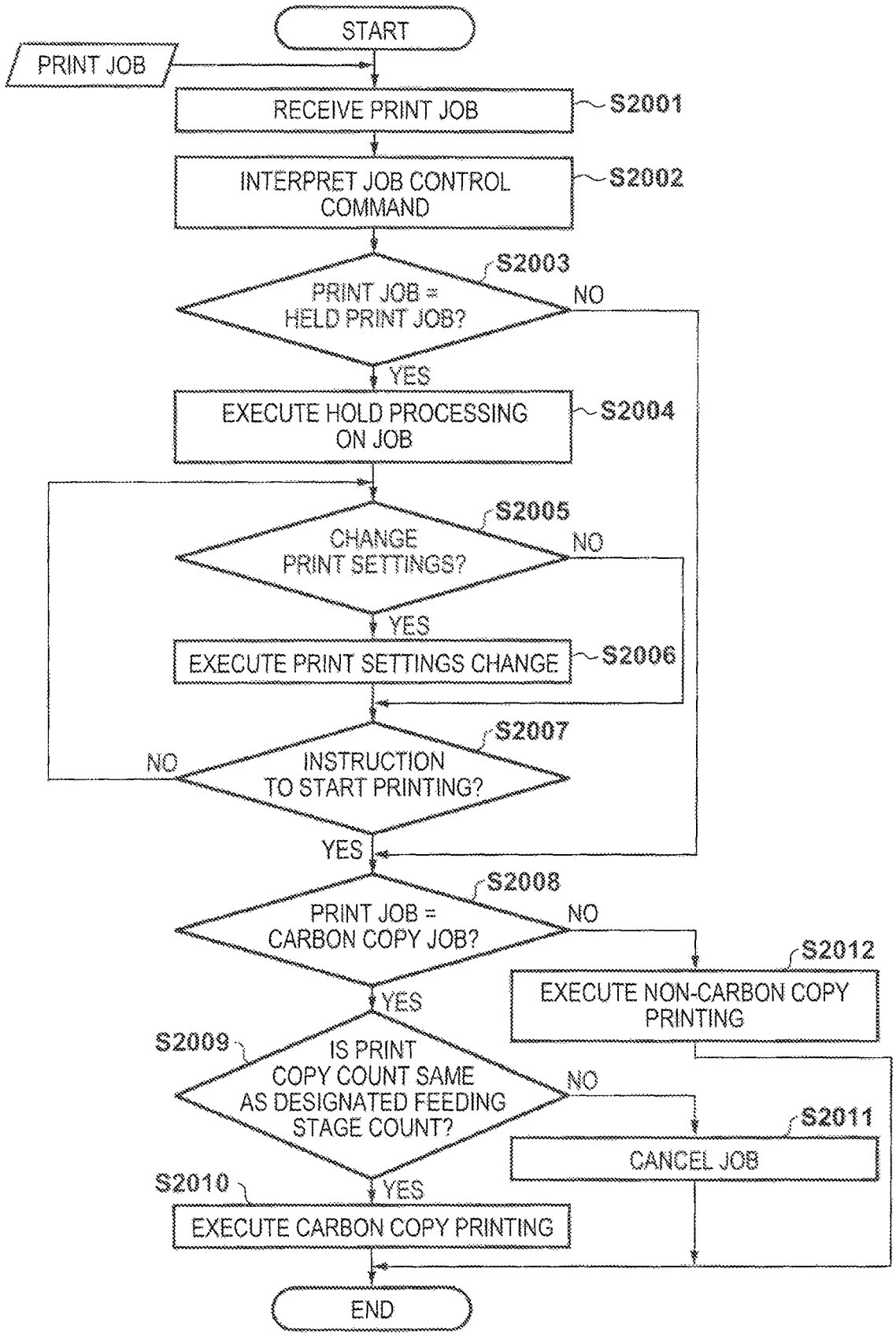
FIG. 20 is a flowchart illustrating carbon copy job execution control processing.

Processing to cancel a carbon copy job when the copy count of the carbon copy job has been changed according to this embodiment will be described with reference to FIG. 20. The processing illustrated in FIG. 20 is, for example, implemented by a CPU 201 of an image forming apparatus 100 reading out a program stored in a ROM 202 to a RAM 203 and executing the program.

In step S2001, the CPU 201 receives a print job 601 via a network I/F 212 and stores the received print job in the RAM 203. In step S2002, the CPU 201 executes control command interpretation processing on the print job received in step S2001. In step S2003, the CPU 201 determines whether the print job interpreted in step S2002 is a held print job. Here, if it is determined that the print job is a held print job, the process advances to step S2004. Otherwise, the process advances to step S2008.

In step S2004, the CPU 201 executes hold processing on the print job received in step S2001. In step S2005, the CPU 201 determines whether an operation to change the print settings has been instructed. The operation to change the print settings includes an operation to change the print copy count. Here, if it is determined that the operation to change the print settings has been instructed, the process advances to step S2006. Otherwise, the process advances to step S2007. In step S2006, the CPU 201 executes the operation to change the print settings. In step S2007, the CPU 201 determines whether a print start instruction has been performed. If it is determined that the print start instruction has been performed, the process advances to step S2008. Otherwise, the processing is repeated from step S2005.

In step S2008, the CPU 201 determines whether the print job, to which it received a print start instruction in step S2007, is a carbon copy job. Here, if it is determined that the print job is a carbon copy job, the process advances to step S2009. Otherwise, the process advances to step S2012. In step S2012, the CPU 201 executes the print processing on the print job, and subsequently, the processing of FIG. 20 ends.

In step S2009, the CPU 201 determines whether the print copy count set by the user and the feeding stage count designated in the print job have the same value. If it is determined that the respective counts have the same value, the CPU 201 executes, in step S2010, the carbon copy printing, and subsequently, the processing of FIG. 20 ends. On the other hand, if it is determined that the respective counts do not have the same value, the CPU 201 cancels, in step S2011, the print processing of the carbon copy job which received the print start instruction, and subsequently, the processing of FIG. 20 ends.

When the print processing of the carbon copy job is to be canceled, it may be set so that a message screen regarding this cancellation will be displayed. For example, the user can be prompted to confirm the setting contents by displaying a message indicating that "Printing cannot be executed since the set copy count and the feeding stage count are different. Please confirm the setting contents." It may be set so that the print setting screen shown in FIG. 15 will be displayed.

Figure 21A:
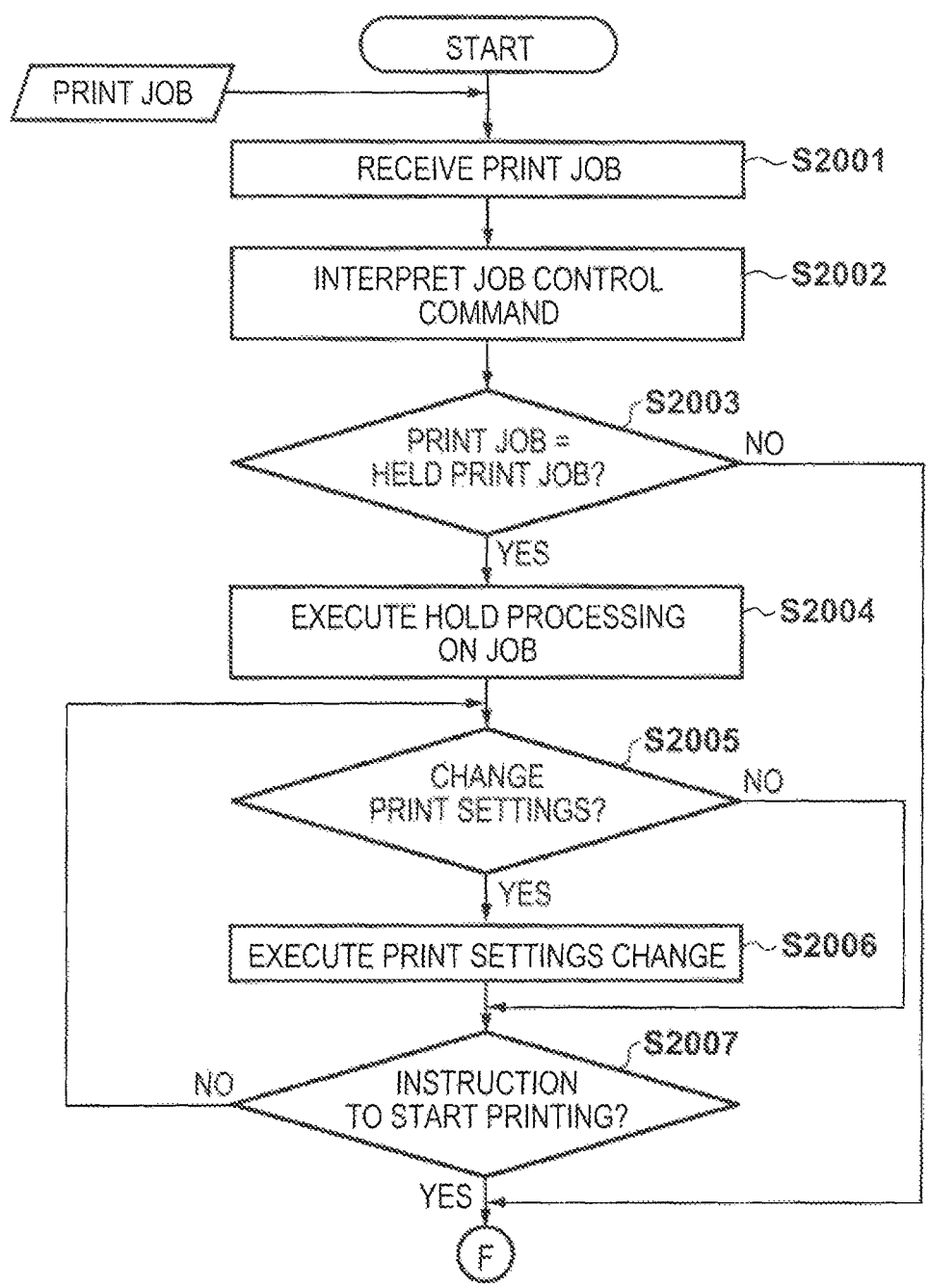
FIGS. 21A and 21B are flowcharts illustrating the carbon copy job execution control processing.
Figure 21B:
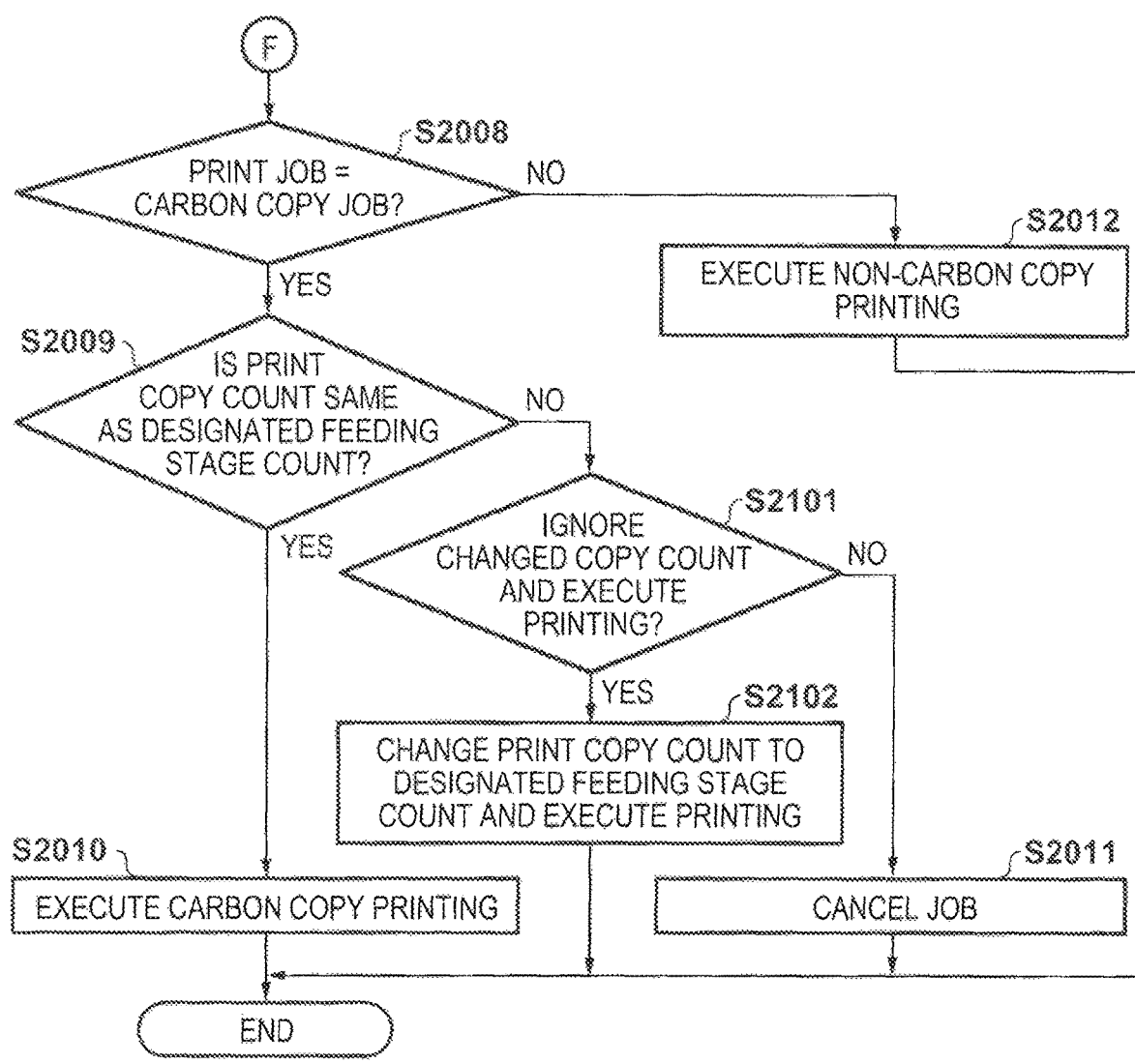

FIGS. 21A and 21B are flowcharts illustrating another processing, according to this embodiment, which is executed when the copy count of a carbon copy job has been changed. FIGS. 21A and 21B differ from FIG. 20 in the processes of steps S2101 and S2102.

Figure 22:
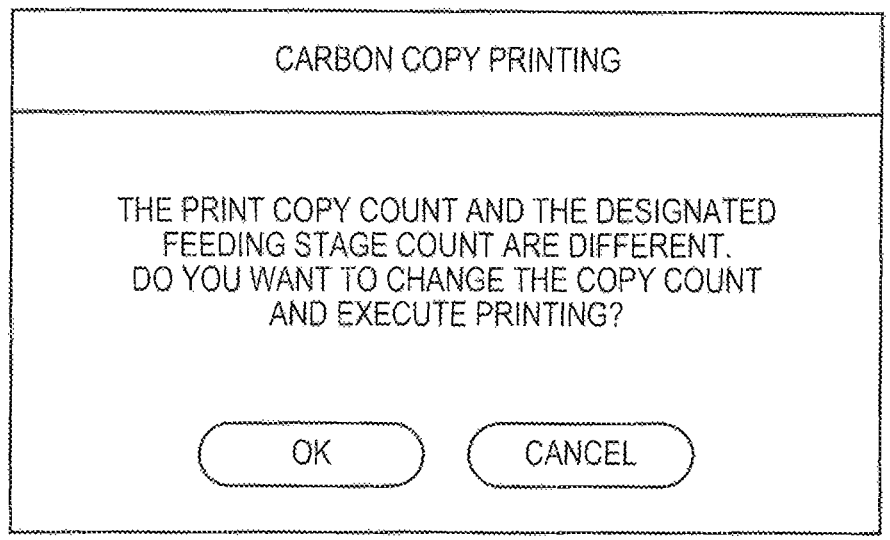
FIG. 22 is a view showing a UI screen of an image forming apparatus.

In step S2009, if it is determined that the print copy count set by the user and the feeding stage count designated in the print job do not have the same value, the process advances to step S2101. In step S2101, the CPU 201 displays a screen as shown in FIG. 22 on an operation unit 211, and accepts an instruction to change or not change the print copy count set by the user to the feeding stage count designated in the print job and execute the printing. If an instruction to change the print count and execute printing is accepted, the CPU 201 executes, in step S2102, printing upon changing the print copy count set by the user to the feeding stage count designated in the print job, and subsequently, the processing of FIGS. 21A and 21B ends. On the other hand, if an instruction not to change the print copy count is accepted, the CPU cancels, in step S2011, the print processing of the carbon copy job that received the print start instruction, and subsequently, the processing of FIGS. 21A and 21B ends.

As described above, according to this embodiment, in a case in which the copy count of a carbon copy job has been changed by the user and the changed copy count differs from the feeding stage count designated in the carbon copy job, the execution of this carbon copy job is canceled. Alternatively, the change made to the copy count by the user is ignored, and the print copy count set by the user is changed to have the same value as the feeding stage count, and the job is printed. As a result, it is possible to avoid a situation in which the print copy count set by the user and the feeding stage count designated in the print job are inconsistent.

Fifth Embodiment

Points different from those in the first to fourth embodiments will be described in the fifth embodiment hereinafter.

Figure 23:
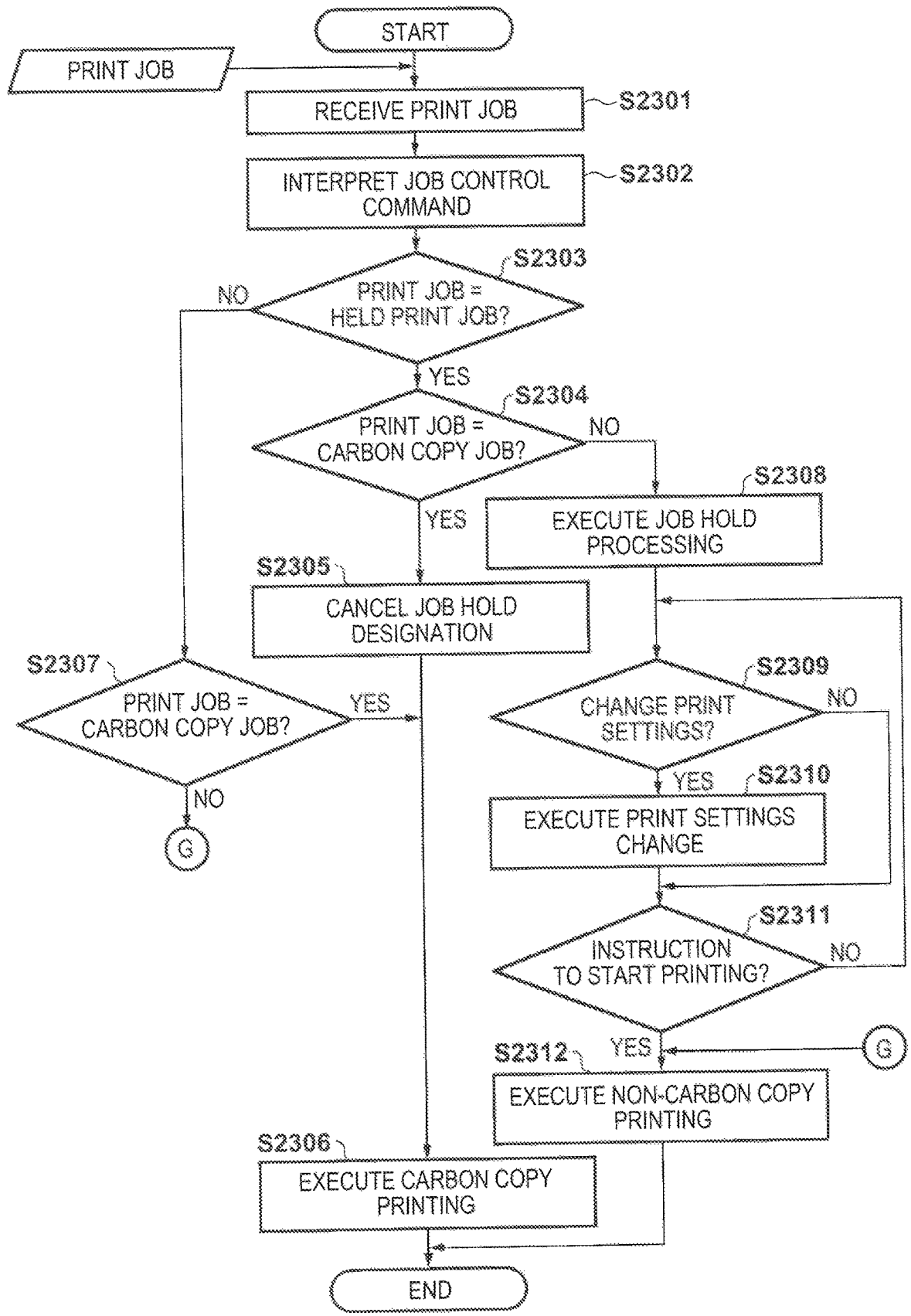
FIG. 23 is a flowchart illustrating carbon copy job execution control processing.

Processing to cancel a job hold designation in a case in which a carbon copy setting is included in a held print job according to this embodiment will be described with reference to FIG. 23. The processing illustrated in FIG. 23 is implemented by, for example, a CPU 201 of an image forming apparatus 100 reading out a program stored in a ROM 202 to a RAM 203 and executing the program.

In step S2301, the CPU 201 receives a print job via a network I/F 212 and stores the print job in the RAM 203. In step S2302, the CPU 201 executes control command interpretation processing on the print job received in step S2301. In step S2303, the CPU 201 determines whether the print job interpreted in step S2302 is a held print job. Here, if it is determined that the print job is a held print job, the process advances to step S2304. Otherwise, the process advances to step S2307.

In step S2304, the CPU 201 determines whether a carbon copy setting is included in the print job interpreted in step S2302. If it is determined that the carbon copy setting is included, the CPU 201 cancels, in step S2305, the hold designation of the print job, and the process advances to step S2306. That is, in this embodiment, the hold designation on the carbon copy job is canceled and the printing is executed so as to prevent the user interface screen, by which the copy count can be changed on the image forming apparatus 100, from being displayed at the time of a hold printing operation. As a result, it can prevent the user from changing the copy count when the carbon copy job is to be printed.

If it is determined that the print job is not a held print job in step S2303, the CPU 201 determines, in step S2307, whether a carbon copy setting is included in the print job interpreted in step S2302. If it is determined that the carbon copy setting is included in the print job, the CPU 201 executes, in step S2306, the carbon copy printing, and subsequently the processing of FIG. 23 ends. On the other hand, if it is determined that the carbon copy setting is not included in the print job, the CPU 201 executes, in step S2312, the print processing on the print job, and subsequently the processing of FIG. 23 ends.

If it is determined that the carbon copy setting is not included in the print job in step S2304, the CPU 201 executes, in step S2308, hold processing on the print job, and the process advances to step S2309. In step S2309, the CPU 201 determines whether an operation to change the print settings has been instructed. Here, if it is determined that the operation to change the print settings has been instructed, the CPU 201 executes, in step S2310, the operation to change the print settings, and the process advances to step S2311. On the other hand, if it is determined that the operation to change the print settings has not been instructed in step S2309, the process advances to step S2311.

In step S2311, the CPU 201 determined whether a printing start instruction has been performed. Here, if it is determined that the printing start instruction has been performed, the process advances to step S2312. Otherwise, the processing is repeated from step S2309.

Figure 24:
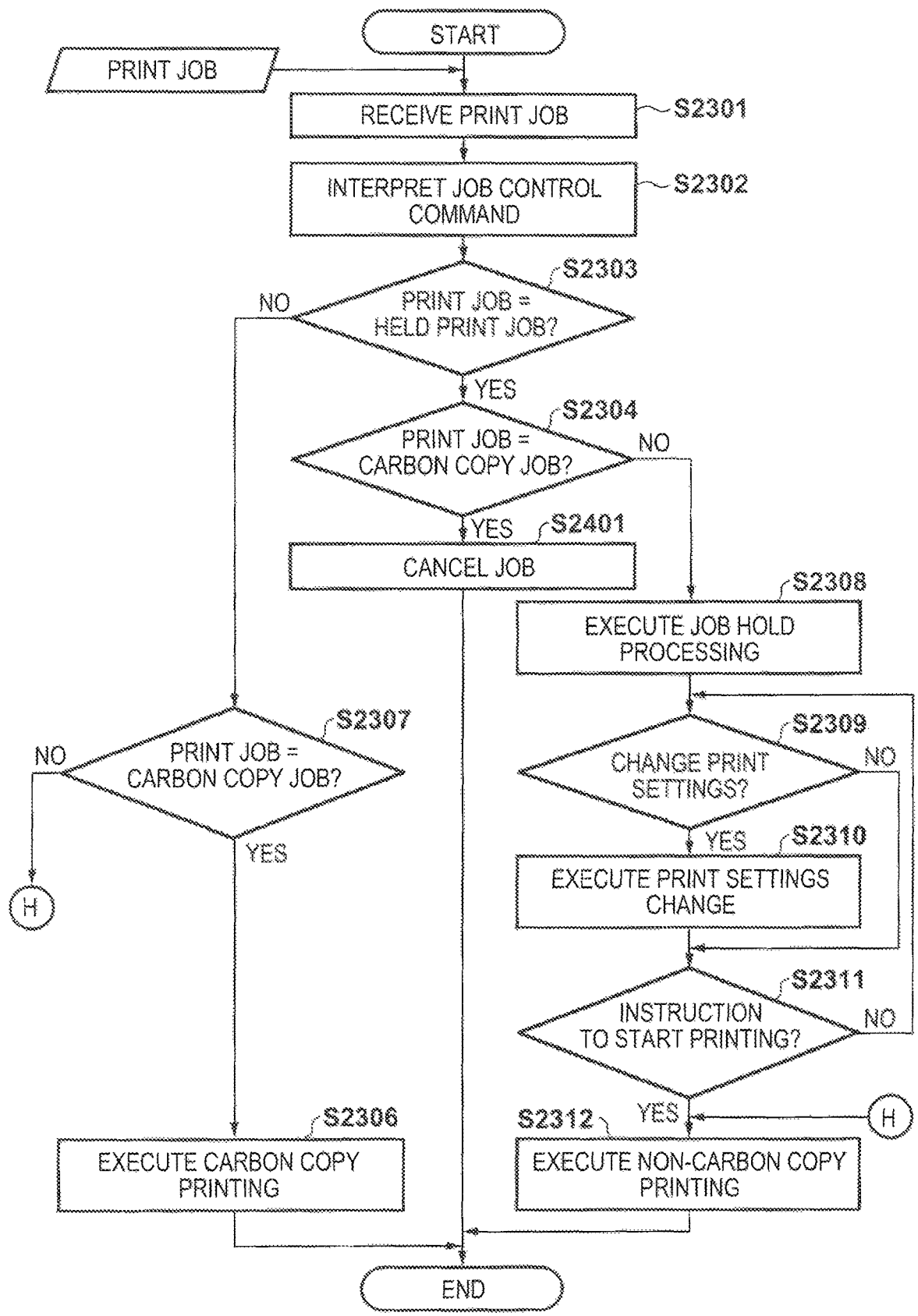
FIG. 24 is a flowchart illustrating the carbon copy job execution control processing.

Processing to cancel a print job when a carbon copy setting is included in a held print job will be described next with reference to FIG. 24. FIG. 24 differs from FIG. 23 in the process of step S2401.

If it is determined, in step S2304, that a carbon copy setting is included in the print job, the CPU 201 cancels, in step S2401, the print job, and subsequently the processing of FIG. 24 ends. That is, in this embodiment, the execution of a carbon copy job is canceled so as to prevent the user interface screen, which allows the copy count to be changed on the image forming apparatus 100, from being displayed at the time of the hold printing operation. As a result, it is possible to prevent the user from changing the copy count when the carbon copy job is to be printed.

In a case in which the copy count and the feeding stage count become inconsistent due to the copy count setting of a carbon copy job being changed, it is possible that the printed product of the job will not be output from the desired feeding stage if the print copy count is decreased. Also, it is also possible that sheets may be wastefully output if the print copy count is increased. In this embodiment, if the carbon copy setting is included in the held print job, the hold designation on the print job is canceled in the above manner. Furthermore, the print job is also canceled. As a result, a state in which a printing operation is executed inappropriately in the above-described manner can be avoided by not providing the user an opportunity to change the copy count on the image forming apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-197770, filed Oct. 11, 2017, which is hereby incorporated by reference herein in its entirety.

What is claimed is:

1. A printer that executes printing based on a print job, comprising:
   a memory containing instructions; and
   at least one processor for executing the instructions to operate as
   a first receiving unit configured to receive from a computer a print job for printing a plurality of copies, wherein, from a plurality of sheet holding units, a different sheet holding unit can be respectively specified for each copy of the plurality of copies;
   a display unit configured to display the number of copies of the print job;
   a second receiving unit configured to receive an instruction from a user to change the displayed number of copies of the print job; and
   a cancelling unit configured to cancel, based on the changed number of copies, the print job corresponding to the number of copies which has been instructed to be changed.

2. The printer according to claim 1, further executing the instructions to operate as an accepting unit configured to accept an execution instruction to execute the print job, and wherein the accepting unit accepts a selection of the print job in a list of print jobs to which a hold printing operation is to be executed in the printer.

3. The printer according to claim 1, further executing the instructions to operate as
   an accepting unit configured to accept an execution instruction to execute the print job, and
   a control unit configured to, in a case in which the number of copies which has been instructed to change and a sheet holding unit count are different from each other for the print job for which the execution instruction has been accepted by the accepting unit, cause the display unit to display a setting screen to match the number of copies which has been instructed to change and the sheet holding unit count.

4. The printer according to claim 1, further executing the instructions to operate as a control unit configured to control the second receiving unit not to receive the instruction from the user to change the number of copies of the print job.

5. The printer according to claim 1, further executing the instructions to operate as
   an accepting unit configured to accept an execution instruction to execute the print job, and
   a control unit configured to, in a case in which the number of copies which has been instructed to change and a sheet holding unit count are different from each other for the print job for which the execution instruction has been accepted by the accepting unit, control the execution of the print job so that printing will be executed in accordance with the displayed number of the copies regardless of the number of copies which has been instructed to change.

6. The printer according to claim 1, further executing the instructions to operate as
   an accepting unit configured to accept an execution instruction to execute the print job, and
   a selecting unit configured to select, in a case in which the number of copies which has been instructed to change and a sheet holding unit count are different from each other for the print job for which the execution instruction has been accepted by the accepting unit, whether to execute printing in accordance with the displayed number of copies regardless of the number of copies which has been instructed to change, or to cancel the execution of the print job,
   wherein the cancelling unit cancels the execution of the print job in accordance with a result of the selection by the selecting unit.

7. The printer according to claim 1, further comprising an accepting unit configured to accept an execution instruction to execute the print job, and
   wherein in a case in which the number of copies which has been instructed to change and a sheet holding unit count are different from each other for the print job for which the execution instruction has been accepted by the accepting unit, the cancelling unit cancels the execution of the print job.

8. The printer according to claim 1, further executing the instructions to operate as a control unit configured to, in a case in which the print job is included in a job of a hold printing operation, control an execution of the print job so as not to perform the hold printing operation in the printer.

9. The printer according to claim 8, wherein a user interface screen for changing the displayed number of copies of the print job is not displayed when the execution of the print job is controlled.

10. The printer according to claim 1, further executing the instructions to operate as a control unit configured to divide the print job into each copy designated in the print job.

11. The printer according to claim 10, wherein in a case in which an execution instruction has been made for one of the divided print jobs, the control unit executes all of the divided print jobs.

12. The printer according to claim 10, wherein in a case in which a deletion instruction has been made for one of the divided print jobs, the control unit deletes all of the divided print jobs.

13. A control method that is executed in a printer which executes printing based on a print job, the method comprising:

receiving from a computer a print job for printing a plurality of copies, wherein, from a plurality of sheet holding units, a different sheet holding unit can be respectively specified for each copy of the plurality of copies;

displaying the number of copies of the print job;

receiving an instruction from a user to change the displayed number of copies of the print job; and cancelling, based on the changed number of copies, the print job corresponding the number of copies of which has been instructed to be changed.

14. A printer that executes printing based on a print job, comprising:

a memory containing instructions; and at least one processor for executing the instructions to operate as a first receiving unit configured to receive from a computer a first print job for printing a plurality of copies, wherein, from a plurality of sheet of sheet holding units, a different sheet holding unit can be respectively specified for each copy of the plurality of copies, a display unit configured to display the number of copies of the first print job or the second print job;

a second receiving unit configured to receive an instruction from a user to change the displayed number of copies;

a print unit; and a control unit configured to allow the print unit to print with the changed number of copies of the second print job and inhibit the print unit from printing with the changed number of copies of the first print job.

* * * * *